(12) United States Patent
Oshita

(10) Patent No.: US 9,501,148 B2
(45) Date of Patent: Nov. 22, 2016

(54) PORTABLE DISPLAY DEVICE AND OPERATION DETECTING METHOD

(71) Applicant: CASIO COMPUTER CO., LTD., Shibuya-ku, Tokyo (JP)

(72) Inventor: Yuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 24 days.

(21) Appl. No.: 14/293,834

(22) Filed: Jun. 2, 2014

(65) Prior Publication Data

US 2014/0375551 A1    Dec. 25, 2014

(30) Foreign Application Priority Data

Jun. 20, 2013    (JP) ................. 2013-129509

(51) Int. Cl.
*G09G 5/00*    (2006.01)
*G06F 3/01*    (2006.01)

(52) U.S. Cl.
CPC ....... *G06F 3/016* (2013.01); *G06F 2200/1636* (2013.01)

(58) Field of Classification Search
CPC .................. G06F 1/1626; G06F 1/1694; G06F 2200/1637; G06F 3/0346; G06F 2200/1636
USPC ........................................................ 345/156
See application file for complete search history.

(56) References Cited

U.S. PATENT DOCUMENTS

| 8,587,530 B2 | 11/2013 | Morimoto et al. |
| 2005/0212757 A1 | 9/2005 | Marvit et al. |
| 2010/0033422 A1 | 2/2010 | Mucignat et al. |
| 2011/0087454 A1 | 4/2011 | Lee et al. |

(Continued)

FOREIGN PATENT DOCUMENTS

| JP | 2009-278294 A | 11/2009 |
| JP | 2012-146156 A | 8/2012 |

(Continued)

OTHER PUBLICATIONS

Partial European Search Report dated Nov. 3, 2014, issued in counterpart European Application No. 14172404.7.

(Continued)

*Primary Examiner* — Kent Chang
*Assistant Examiner* — Scott Au
(74) *Attorney, Agent, or Firm* — Holtz, Holtz & Volek PC

(57) ABSTRACT

A portable display device includes: an acceleration sensor; an outputting section outputting a detection signal when a measurement value changes across a reference value; a calculating section calculating a duration time in which the measurement value exceeds the reference value; a judging section judging whether the movement state is due to running based on an occurrence frequency of the movement state and the duration time; a setting section setting a running state when the movement state is due to the running; a calculating section calculating a time interval between the movement states; a continuous tap judging section judging whether the movement states are due to continuous tap operations according to a judgment condition based on the duration time and time interval; and a setting range changing section setting a range of the judgment condition in the running state to be broader than that in a non-running state.

10 Claims, 22 Drawing Sheets

(56) References Cited

U.S. PATENT DOCUMENTS

| | | |
|---|---|---|
| 2011/0215995 A1 | 9/2011 | Shigeta et al. |
| 2012/0185203 A1 | 7/2012 | Tanaka |
| 2013/0138394 A1* | 5/2013 | Shiga .......................... 702/160 |
| 2014/0253487 A1 | 9/2014 | Bezinge et al. |

FOREIGN PATENT DOCUMENTS

| | | |
|---|---|---|
| JP | 2014153729 A | 8/2014 |
| WO | 2011115060 A1 | 9/2011 |
| WO | 2013057048 A1 | 4/2013 |
| WO | 2014196156 A1 | 12/2014 |

OTHER PUBLICATIONS

Japanese Office Action dated Jan. 27, 2015, issued in counterpart Japanese Application No. 2013-129509.
Extended European Search Report dated Feb. 20, 2015, issued in counterpart European Application No. 14172404.7.

* cited by examiner

PORTABLE DISPLAY DEVICE AND OPERATION DETECTING METHOD

CROSS-REFERENCE TO RELATED APPLICATIONS

This application is based upon and claims the benefit of priority from the prior Japanese Patent Application No. 2013-129509 filed on Jun. 20, 2013, the entire contents of which are incorporated herein by reference.

BACKGROUND OF THE INVENTION

Field of the Invention

The present invention relates to a portable display device and an operation detecting method.

Description of the Related Art

Heretofore, there has been a portable display device that detects acceleration changes occurring due to light touch (tap) operations on a display screen and/or a chassis to perform processing. In order to detect such tapping operations (hereinafter described as "taps"), acceleration waveforms obtained by the acceleration sensor are usually sampled to analyze waveforms corresponding to taps (for example, see Japanese Patent Application Laid-Open Publication No. 2009-278294, which corresponds to U.S. Pat. No. 8,587,530 B2).

However, because the portable display device moves while being carried by a user, accelerations relevant to movements of the portable display device itself are added to changes of accelerations relevant to taps. Japanese Patent Application Laid-Open Publication No. 2012-146156, which corresponds to US2012/0185203A1, therefore discloses the technique to previously define magnitudes of acceleration amplitudes corresponding to taps and/or ranges of amplitude frequencies, and perform operations while distinguishing the changes of accelerations relevant to taps from changes of accelerations relevant to other factors such as drop and collision.

However, the detecting process becomes complicated when detecting the waveform by frequency analysis in the case that periodical changes of accelerations overlap with changes of accelerations relevant to taps, the periodical changes occurring in the portable display device when a user thereof travels, especially runs, while holding the portable display device in his/her hand and/or wearing the same on his/her body. Meanwhile, in the case of detecting taps, especially double taps as two continuous tap operations, from time-series data, if a detection criterion is set loosely, misdetections in a state of standing still increase. If the detection criterion is set severely, tap operation detection becomes difficult during the movement.

The present inventions are a portable display device and an operation detecting method which are capable of easily and properly detecting double taps depending on a movement state of a user of the portable display device.

SUMMARY OF THE INVENTION

One mode of the present invention is a portable display device including: an acceleration sensor that measures at least one acceleration; a detection signal outputting section that outputs a detection signal when at least one measurement value relevant to a magnitude of the acceleration changes across a predetermined reference value; a movement duration time calculating section that calculates a duration time of at least one movement state in which the measurement value exceeds the predetermined reference value by using the detection signal; a running judging section that judges whether or not the movement state is due to a running of a user of the portable display device, based on an occurrence frequency of the movement state and the duration time calculated individually for the movement state; a running state setting section that sets the movement state as a running state during a predetermined time period when the running judging section judges that the movement state is due to the running of the user; a movement interval calculating section that calculates, in the case that a plurality of movement states are measured, a time interval between the movement states by using the detection signal; a continuous tap judging section that judges whether or not the plurality of movement states are measured due to continuous tap operations, according to a judgment condition based on the calculated duration time and the calculated time interval; and a setting range changing section that sets a range of the judgment condition for judging the continuous tap operations in the continuous tap judging section in the case of the running state to be broader than a range of the judgment condition in a non-running state.

BRIEF DESCRIPTION OF THE DRAWINGS

The above and further objects, features and advantages of the present invention will be made clearer by the following detailed description and the attached drawings, in which.

DESCRIPTION OF THE PREFERRED EMBODIMENT

Hereinafter, embodiments of the present invention will be described with reference to the drawings.

First Embodiment

Figure 1:
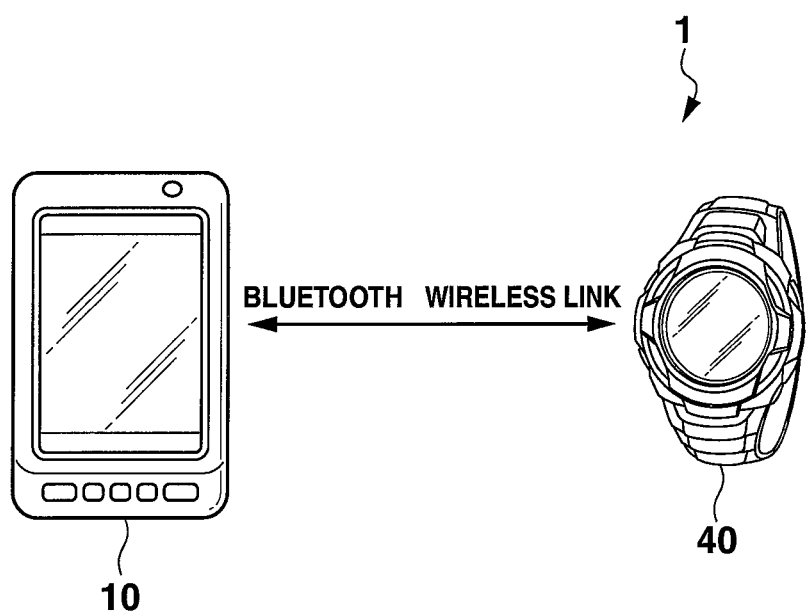
FIG. 1 is a general view of an announcement system according to an embodiment of the present invention.

FIG. 1 is a general view of an announcement system 1 including an electronic watch 40 which is a portable display device of the embodiment of the present invention.

The announcement system 1 is composed of the electronic watch 40, and a smart phone 10 as an external device. The electronic watch 40 is carried by a user while being worn on the wrist of the user. The electronic watch 40 and the smart phone 10 can communicate with each other by a near field wireless communication, for example, Bluetooth communication (Bluetooth: registered trademark).

Figure 2:
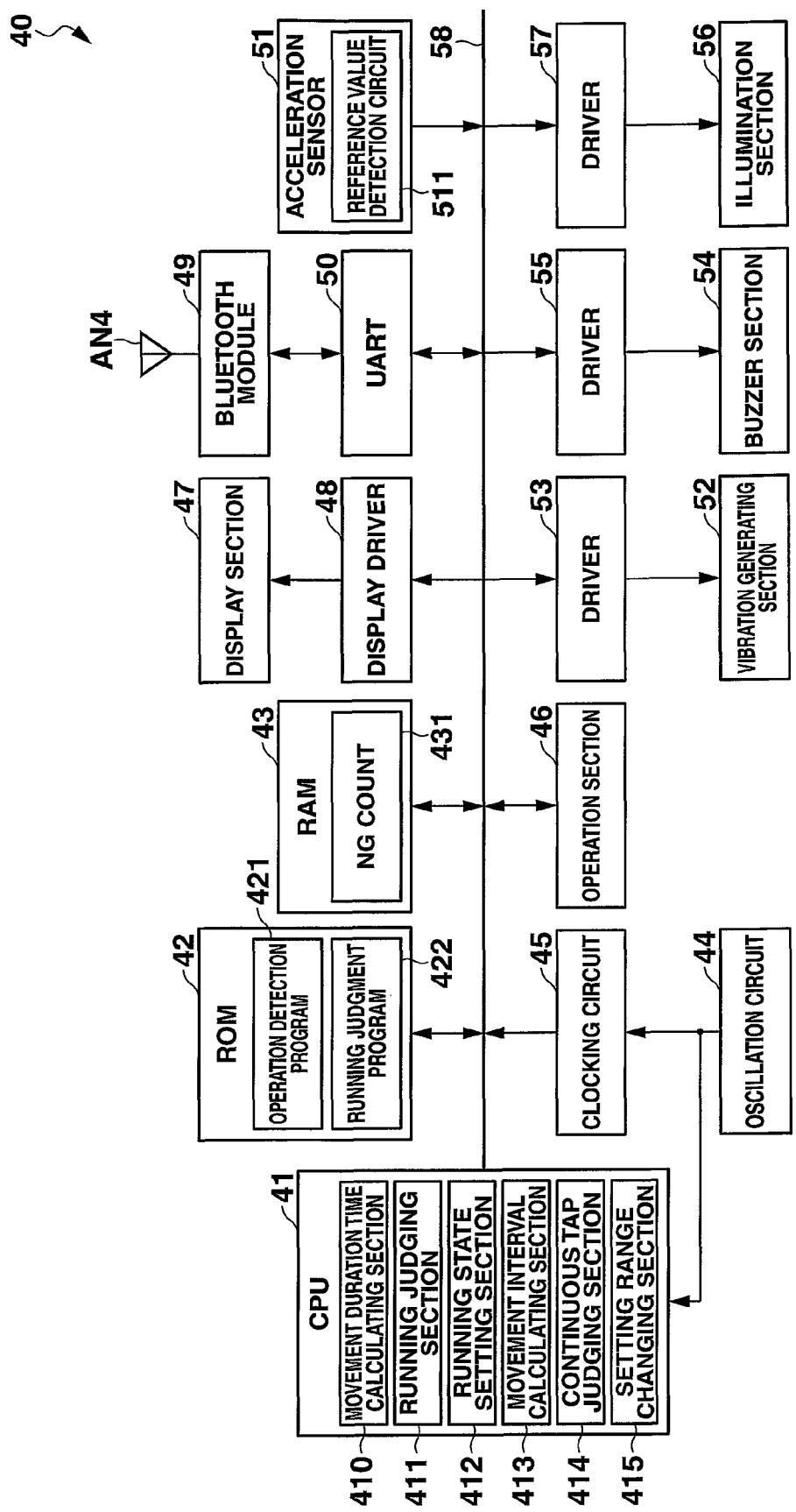
FIG. 2 is a block diagram illustrating an internal structure of an electronic watch.

FIG. 2 is a block diagram of the internal structure of the electronic watch 40.

The electronic watch includes: a Central Processing Unit (CPU) 41 (a movement duration time calculating section 410, a running judging section 411, a running state setting section 412, a movement interval calculating section 413, a continuous tap judging section 414, a setting range changing section 415); a Read Only Memory (ROM) 42; a Random Access Memory (RAM) 43; an oscillation circuit 44; a clocking circuit 45; an operation section 46; a display section 47; a display driver 48; a Bluetooth module 49 and a Universal Asynchronous Receiver/Transmitter (UART) 50; an acceleration sensor 51; a vibration generating section 52 and a driver 53 thereof; a buzzer section 54 and a driver 55 thereof; an illumination section 56 and a driver 57 thereof; a bus 58, and so on.

The CPU 41 carries out various calculations and comprehensively controls the whole operation of the electronic watch 40. The CPU 41 executes an operation detection program 421 to detect a tap/taps by a user, and performs situational operations, for example, stopping announcement operations of the vibration generating section 52, the buzzer section 54 and/or the illumination section 56, if such announcement operations are being performed. The CPU 41 also executes a running judgment program 422 to perform judging/setting on whether or not a user of the electronic watch 40 is in a running state.

The ROM 42 stores various control programs, application programs and initial setting data. The CPU 41 reads out these control programs and/or initial setting data as necessary to utilize them in various operations of the electronic watch 40. The control programs include the operation detection program 421 and the running judgment program 422. The operation detection program 421 is executed in the background and is resident when tapping input is possible, and performs processing regarding tap detection. The running judgment program 422 is invoked to be executed periodically (e.g. per second) when taping input is possible.

The RAM 43 provides the CPU 41 with a working memory space, and stores temporary data. The RAM 43 also stores a NG count 431 which is a value for determining a running state of a user.

The oscillation circuit 44 generates a signal of a predetermined frequency to output it as a clock signal to the CPU 41 and the clocking circuit 45. The oscillation circuit 44 may include a configuration for correcting output frequencies, such as a temperature compensation circuit. The oscillation circuit 44 may also have a configuration capable of outputting not only the generated clock signal, but also the clock signal that has been divided into a predetermined frequency through a frequency dividing circuit.

The clocking circuit 45 is a counter circuit that counts a signal of a predetermined frequency input from the oscillation circuit 44, and adds the counts to an initial time to keep the current time. Alternatively, the clocking circuit 45 may have a configuration to store a current time value obtained by software calculation using the CPU 41 and/or a Real Time Clock (RTC).

The operation section 46 receives an input operation(s) by a user to output it as an input signal(s) to the CPU 41. The operation section 46 is equipped with one or a plurality of operation button, and converts a pressing operation onto each operation button into an electrical signal as the input signal.

In this electronic watch 40, the CPU 41 performs tap detection on the basis of an acceleration(s) measured by the acceleration sensor 51, so that the detected tap(s) is received as the input operation(s), in addition to the input operations via the operation section 46.

The display section 47 is a digital display section for displaying a time and/or various pieces of information. The display section 47 includes a liquid crystal display (LCD), but is not limited thereto. The LCD has a rectangle shape in this embodiment. The display driver 48 is a liquid crystal driver that performs driving/operating relative to display correspondingly to a display screen, namely, the LCD in this embodiment, and drives each pixel and/or segment of the LCD to perform displaying. Alternatively, the display section 47 may be an analog display section that displays time (second/minute/hour), numerical values and various pieces of information by driving a plurality of hands so that each of them rotates to point each indicator on a dial plate. In this case, the electronic watch 40 may include a stepping motor that drives each hand so that it rotates, and a driving circuit that drives the stepping motor, instead of the display driver 48.

The Bluetooth module 49 executes data processing for performing the near field wireless communication with the external device. The Bluetooth module 49 modulates the signal relevant to output information which has been input from the CPU 41 through the UART 50, and transmits the modulated signal to the external device by using the antenna AN4. The Bluetooth module 49 also demodulates radio wave, which has been received from the external device through the antenna AN4, into the received signal, and output the received signal to the CPU 41 via the UART 50.

The UART 50 performs parallel/serial conversion of the signal that has been input from the CPU 41 and to be transmitted from the Bluetooth module 49, and of the signal that has been received and demodulated by the antenna AN4 and the Bluetooth module 49 and to be output to the CPU 41.

The acceleration sensor 51 is a tri-axial acceleration sensor capable of measuring accelerations in three axial directions which are mutually orthogonal.

Figure 3:
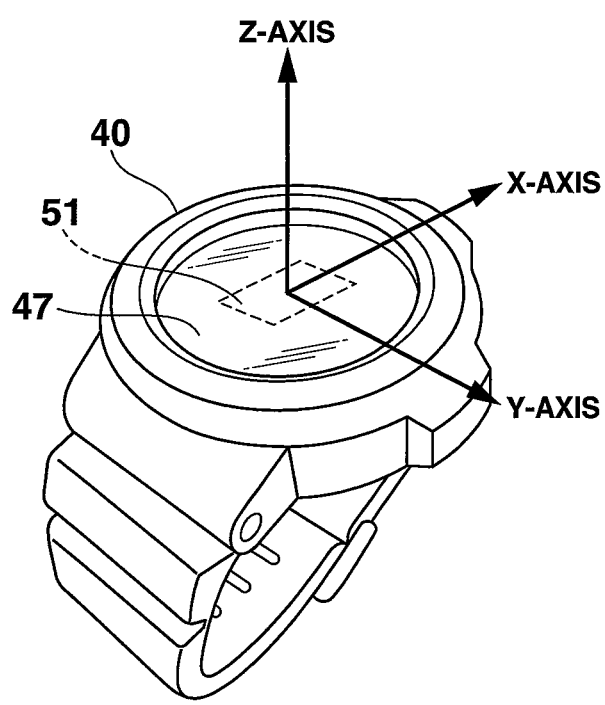
FIG. 3 is a diagram illustrating axis setting of the acceleration sensor.

FIG. 3 illustrates axial setting of the acceleration sensor 51.

The three axial direction are, though not especially limited, a direction (Z-axis) which is perpendicular to the display screen, and two directions (X-axis and Y-axis) which are parallel to the display screen, and one of which is parallel to a band attaching direction and another of which is perpendicular to the band attaching direction. The acceleration sensor 51 of this embodiment is equipped with a reference value detection circuit 511 (a detection signal outputting section, a first detection signal outputting section and a second detection signal outputting section), and does not output the measured acceleration value. The reference value detection circuit 511 compares the measurement value of acceleration in each axial direction with a predetermined reference value, and outputs interrupt signals INT1, INT2. The reference value detection circuit 511 of this embodiment outputs low level signals as the interrupt signals INT1, INT2 in a normal state, and when a predetermined condition is met, outputs high level pulse signals each having a preset length.

Here, when the measurement values of accelerations in the respective axial directions change from the state that all of magnitudes (absolute values) of the measurement values are less than a predetermined second reference value A2 (for example, 3.0 G) to the state that any of the magnitudes of the measurement values is equal to or more than the second reference value A2, the interrupt signal INT2 is output as a high level pulse waveform signal. When the measurement values of accelerations in the respective axial directions change from the state that any of the magnitudes of the measurement values is equal to or more than a predetermined first reference value A1 (for example, 2.0 G) to the state that all of the magnitudes of the measurement values are less than the first reference value A1, the interrupt signal INT1 is output as a high level pulse waveform signal.

As the acceleration sensor 51, for example, a chip sensor using a piezoelectric element such as lead zirconate titanate (PZT) may be used. A measuring section of the acceleration sensor 51 and the reference value detection circuit 511 are formed on the same chip, and only the interrupt signals INT1, INT2 are output to the CPU 41 through the bus 58.

The vibration generating section 52 is equipped with, for example, a rotating motor, and generates vibration depending on rotation of the rotating motor. The driver 53 outputs, to the vibration generating section 52, a driving voltage(s) for making the rotating motor execute a rotation operation(s), on the basis of the control signals input from the CPU 41.

The buzzer section 54 is equipped with, for example, a piezoelectric element such as PZT, and generates a buzzer sound(s) by expansion and contraction (vibration) operations depending on a voltage(s) applied to the piezoelectric element. The driver 55 outputs a driving voltage(s) for making the piezoelectric element of the buzzer section 54 expand and contract on the basis of the control signals input from the CPU 41.

The illumination section 56 illuminates the display section 47. The illumination section 56 may include, for example, a Light Emitting Diode (LED) to illuminate the display section 47 from above of the display surface, and may include an organic Electro-Luminescent Diode (ELD) to make it operate as a back light of the digital display screen of the display section 47. The deriver 57 outputs a driving voltage(s) for making the illumination section 56 emit light on the basis of the control signals input from the CPU 41.

The bus 58 electrically connects the CPU 41 and each of the sections to transfer electrical signals to be transmitted/received.

Next, a double tap detecting operation in the electronic watch 40 of this embodiment will be described.

The electronic watch 40 of this embodiment judges whether or not there has been double-tap operation on the basis of the interrupt signals INT1, INT2 output from the reference value detection circuit 511 of the acceleration sensor 51.

Figure 4:
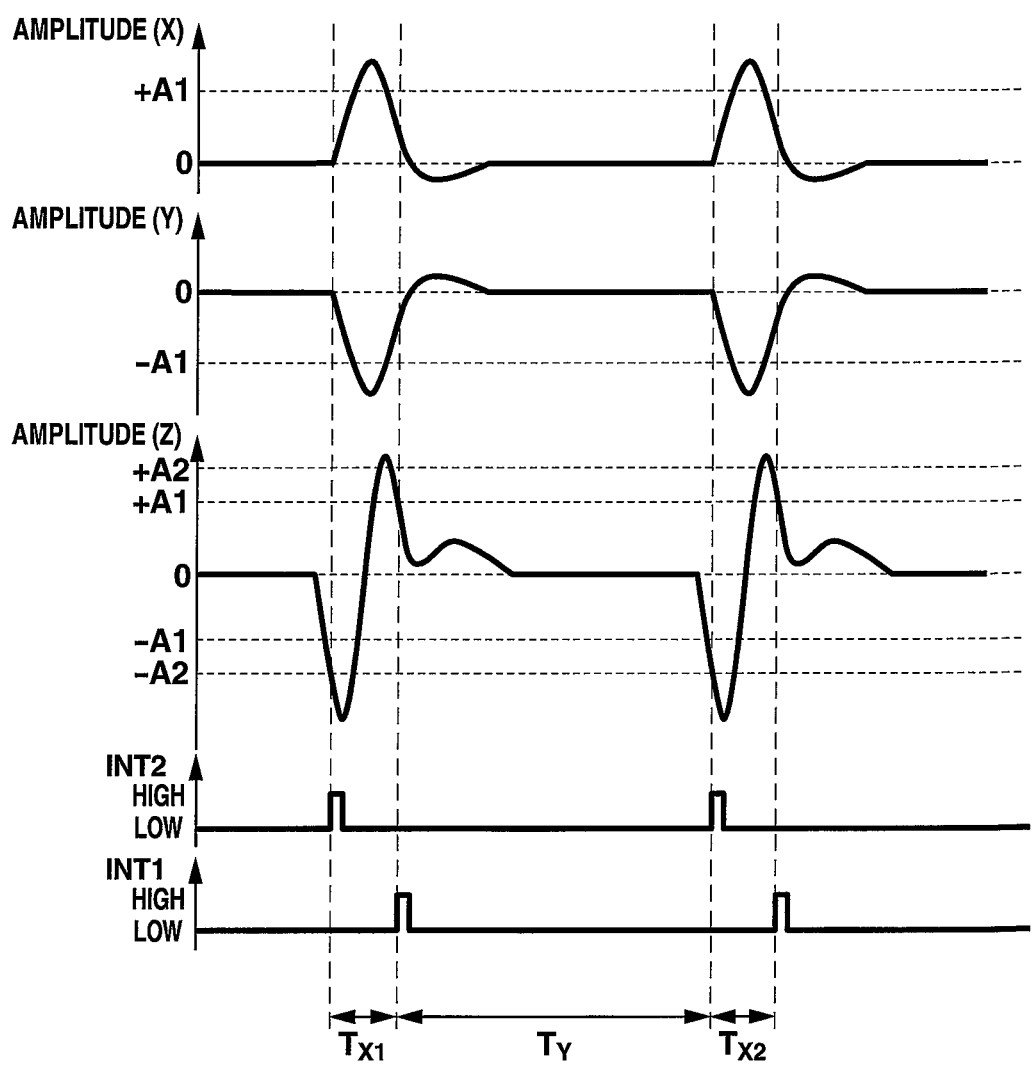
FIG. 4 is a diagram illustrating standard measurement waveforms and interrupt signal waveforms by the acceleration sensor when performing a double tap operation while a user is standing still.

FIG. 4 illustrates standard measurement waveforms and interrupt signal waveforms obtained by the acceleration sensor 51 in the case that a user performs the double-tap operation while standing still.

When a user performs a tap operation on the display screen of the display section 47, a waveform having a sharp shape in a direction perpendicular to the display screen, namely, in Z direction, occurs due to abrupt movement and stop of the electronic watch 40 associated with the tap. At the same time, some variation occurs in X direction and Y direction depending on a reaction of the user. The reference value detection circuit 511 included in the electronic watch 40 of this embodiment outputs the high level interrupt signal INT2 having a predetermined length when any of the magnitudes of the measurement values of accelerations in the three directions exceeds the second reference value A2, namely, when it becomes more than +A2, or −A2 or less. After that, the high level interrupt signal INT1 having a predetermined length is output when all of the magnitudes of the measurement values of accelerations in the three axial directions fall below the first reference value A1, namely, when it becomes a value less than +A1 and more than −A1. The length (predetermined length) of high-level period in the interrupted signal may be sufficiently short pulsing voltage, for example, 5 ms, though is not particularly limited thereto.

The CPU 41 counts the time from detection of the interrupt signal INT2 to detection of the interrupt signal INT1, namely, the duration time $T_{X1}$ in which acceleration is large (movement state). The CPU 41 also counts the time interval $T_Y$ from detection of the interrupt signal INT1 to further detection of the next interrupt signal INT2, and then counts the duration time $T_{X2}$ from detection of the second interrupt signal INT2 to detection of the interrupt signal INT1. After that, when the duration times $T_{X1}$, $T_{X2}$ and time interval $T_Y$ are within a range (condition range) that meets a predetermined condition (judgment condition), it is determined that double tap has been input.

If the interrupt signals INT2, INT1 are not due to the taps, for example, in the case that the electronic watch 40 is moved, and/or in the case that acceleration associated with arm swing of a user is detected, the duration times $T_{X1}$, $T_{X2}$ generally become sufficiently longer (for example, $T_{X1}$, $T_{X2} \geq 100$ ms) than those in the case of the taps. Accordingly, it is judged that the change in acceleration relevant to the interrupt signals INT1, INT2 is caused by the taps when the duration times $T_{X1}$, $T_{X2}$ are shorter than the reference time $T_{X0}$, and it is judged that the change in acceleration relevant to the interrupt signals INT1, INT2 is not caused by the taps (NG) when the duration times $T_{X1}$, $T_{X2}$ are longer than the reference time $T_{X0}$. As the reference time $T_{X0}$ for judging whether or not the duration times $T_{X1}$, $T_{X2}$ are relevant to the taps, for example, 25 ms is set.

At that time, in the case of temporary movement, in order to prevent the occurrences of continuous NG judgments, the operations corresponding to the double tap may be prevented from being executed even when the double tap is detected, until a predetermined prohibition period $T_{Z0}$ (first prohibition period; for example, $T_{Z0}$=500 ms) has passed. Meanwhile, in the case of NG judgment during running of a user, such acceleration changes, in which the duration times $T_{X1}$, $T_{X2}$ are long, are measured periodically (for example, per 400 to 500 ms). Thus, if the prohibition period $T_{Z0}$, in which the operations corresponding to the double taps are prohibited, is provided, detection of double tap operation becomes difficult. Therefore, the detection prohibition period $T_{X0}$ is not provided in the case that acceleration changes periodically.

During the running of the user, because his/her arm easily swings compared with the case of standing still, the above-described reference time $T_{X0}$ may be set so as to be longer. In other words, in the electronic watch 40 of this embodiment, the reference time $T_{X0}$ in the case that a user is running is set so as to have a different value from that in the case a user is standing still. The reference time $T_{X0}$ in the case that a user is in the running state is set so as to be shorter than a normal measurement value (upper limit time) of each of the duration times $T_{X1}$, $T_{X2}$ in the above-described case that acceleration associated with arm swing is detected, etc. The setting of the reference time $T_{X0}$ during running may be changeable, by a user operation, depending on a difference of speeds of arm swings relevant to the numbers of steps of a user per second, etc.

Next, in the case the acceleration larger than the reference value A1 does not occur in X or Y direction because of a user's posture and the like, the interrupt signals INT2, INT1 are sometimes continuously detected twice in a short time period due to acceleration change in Z direction. In view of such case, lower limit time $T_{Y\_MIN}$ (e.g. $T_{Y\_MIN}$=120 ms) is set with respect to the time interval $T_Y$ in this electronic watch 40. When the next interrupt signal INT2 is input at short interval ($T_Y < T_{Y\_MIN}$) after start of measurement of time interval $T_Y$, it is judged that the signal is the second interrupt signal INT2 relevant to the first tap, and the CPU 41 ignores this interrupt signal INT2 and continues to count the time interval $T_Y$.

Meanwhile, when the time interval $T_Y$ is longer than a reference time $T_{Y0}$ (e.g. $T_{Y0}$=350 ms), is judged that the first tap detection is not relevant to the double tap by a user, and is relevant to an incorrect operation and/or noise. When the time interval $T_Y$ continues to be equal to or more than an upper limit time $T_{Y\_MAX}$ (e.g. $T_{Y\_MAX}$=500 mz), which is larger than the reference time $T_{Y0}$, the judgment of double tap may be terminated without the second tap detection.

Figure 5:
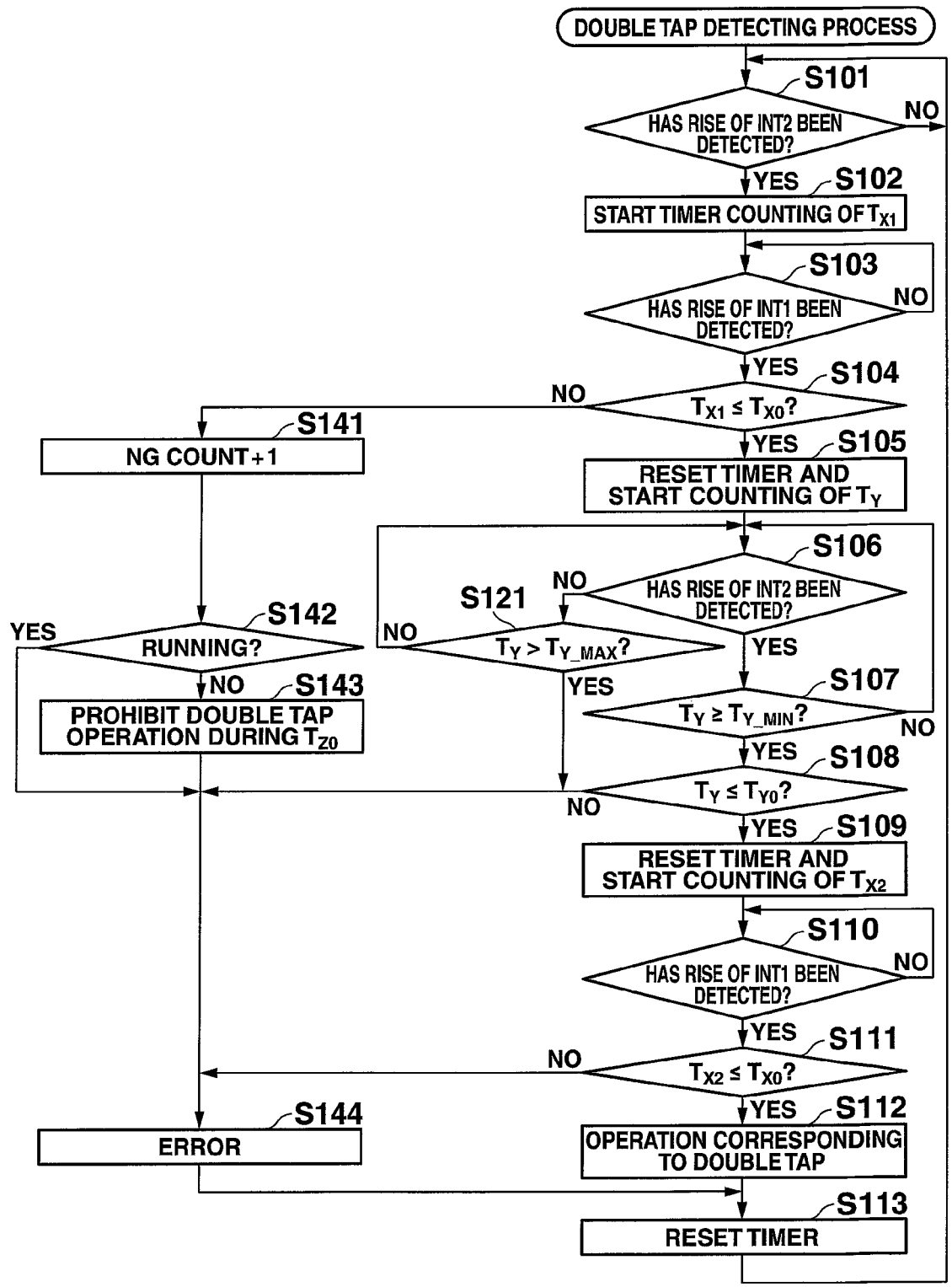
FIG. 5 is a flowchart illustrating control procedures of a double tap detecting process according to a first embodiment.

FIG. 5 illustrates control procedures of a double tap detecting process executed by the CPU 41 of the electronic watch 40 according to this embodiment.

The double tap detecting process always operates when being invoked to be executed in the setting in which the tap operation is possible.

When the double tap detecting process is started, the CPU 41 firstly judges whether or not a rise of the interrupt signal INT2 has been detected (Step S101). When it is judged that the rise of the interrupt signal INT2 has not been detected (Step S101: NO), the CPU 41 repeatedly performs the processing of Step S101.

When the rise of the interrupt signal INT2 has been detected (Step S101: YES), the CPU 41 causes the timer to operate to start to count the duration time $T_{X1}$ (Step S102). Then, the CPU 41 judges whether or not a rise of the interrupt signal INT1 has been detected (Step S103). When it is judged that the rise of the interrupt signal INT1 has not been detected (Step S103: NO), the CPU 41 repeatedly performs the processing of Step S103.

When it is judged that the rise of the interrupt signal INT1 has been detected (Step S103: YES), the CPU 41 judges whether or not the counted duration time $T_{X1}$ is equal to or less than the reference time $T_{X0}$ (Step S104). When it is judged that the duration time $T_{X1}$ is equal to or less than the reference time $T_{X0}$ (Step S104: YES), the CPU 41 resets the timer once, and then promptly starts to count the time interval $T_Y$ (Step S105).

The CPU 41 judges whether or not the rise of the interrupt signal INT2 has been detected (Step S106). When it is judged that the rise of the interrupt signal INT2 has not been detected (Step S106: NO), the CPU 41 judges whether or not the time interval $T_Y$ becomes larger than the upper limit time $T_{Y\_MAX}$ (Step S121). At that time, the CPU 41 may generate a predetermined signal at the time when the counting time by the timer reaches the upper limit time $T_{Y\_MAX}$, and perform judgment using the generated signal, instead of reading the value of the time interval $T_Y$ to directly compare it with the upper limit time $T_{Y\_MAX}$ every time.

When it is judged that the time interval $T_Y$ is not larger than the upper limit time $T_{Y\_MAX}$ (Step S121: NO), the processing by the CPU 41 returns to Step S106. When it is judged that the time interval $T_Y$ is larger than the upper limit time $T_{Y\_MAX}$ (Step S121: YES), the processing by the CPU 41 shifts to Step S144.

When it is judged that the rise of the interrupt signal INT2 has been detected in the judging process of Step S106 (Step S106: YES), the CPU 41 judges whether or not the time interval $T_Y$ is equal to or more than the lower limit time $T_{Y\_MIN}$ (Step S107). When it is judged that the time interval $T_Y$ is not equal to or more than the lower limit time $T_{Y\_MIN}$ (Step S107: NO), the CPU 41 ignores the detected interrupt signal INT2 and makes the processing return to Step S106.

When it is judged that the time interval $T_Y$ is equal to or more than the lower limit time $T_{Y\_MIN}$ (Step S107: YES), the CPU 41 subsequently judges whether or not the time interval $T_Y$ is equal to or less than the reference time $T_{Y0}$ (Step S108). Incidentally, because the reference time $T_{X0}$ during running is set/extended so as to be longer compared with when a user is standing still, also the reference time $T_{Y0}$ may be set/extended to be longer depending on the extension of the reference time $T_{X0}$. Alternatively, the setting of the reference time $T_{Y0}$ may be changed from that in the state of standing still, so that the reference time $T_{Y0}$ during running becomes sufficiently longer than that in the state of standing still, separately from the reference time $T_{X0}$. When it is judged that the time interval $T_Y$ is not equal to or less than the reference time $T_{Y0}$ (Step S108: NO), the processing by the CPU shifts to Step S144.

When it is judged that the time interval $T_Y$ is equal to or less than the reference time $T_{Y0}$ (Step S108: YES), the CPU 41 resets the timer, and then promptly starts to count the duration time $T_{X2}$ (Step S109).

The CPU 41 judges whether or not the rise of the interrupt signal INT1 has been detected (Step S110). When it is judged that the rise of the interrupt signal INT1 has not been detected (Step S110: NO), the CPU 41 repeatedly performs the processing of Step S110.

When it is judged that the rise of the interrupt signal INT1 has been detected (Step S110: YES), the CPU 41 judges whether or not the counted duration time $T_{X2}$ is equal to or less than the reference time $T_{X0}$ (Step S111). When it is judged that the duration time $T_{X2}$ is not equal to or less than the reference time $T_{X0}$ (Step S111: NO), the processing by the CPU 41 shifts to Step S144.

When it is judged that the duration time $T_{X2}$ is equal to or less than the reference time $T_{X0}$ (Step S111: YES), the CPU 41 judges that the double tap has been detected, and executes the operation which has been set correspondingly to the double tap operation (Step S112). The CPU 41 then makes the processing shift to Step S113.

When it is judged that the duration time $T_{X1}$ is not equal to or less than the reference time $T_{X0}$ in the judging process of Step S104 (Step S104: NO), the CPU 41 adds one (1) to the value (occurrence frequency) of the NG count 431 (Step S141). The CPU 41 judges whether or not a current setting is a setting for the case that a user is running (Step S142). The setting for the case that a user is running will be described later. When it is judged that a user is not running (Step S142: NO), the CPU 41 prohibits the double tap operation during the prohibition period $T_{Z0}$ (Step S143). Then processing by the CPU 41 shifts to Step S144.

When it is judged that a user is running (Step S142: YES), the processing by the CPU 41 shifts to Step S144.

When the processing has shifted to Step S144 from any of Steps S142, S143, S121, S108 and S111, the CPU 41 judges that the double tap has not been detected, and performs error processing (Step S144). Concretely, the CPU 41 initializes the time which has been set among the duration times $T_{X1}$, $T_{X2}$ and the time interval $T_Y$. Then the processing by the CPU 41 shifts to Step S113.

When the processing has shifted to Step S113 from Step S112 or Step S144, the CPU 41 resets the timer (Step S113). Then the processing by the CPU 41 returns to the beginning, and the processing is repeated from Step S101.

Figure 6:
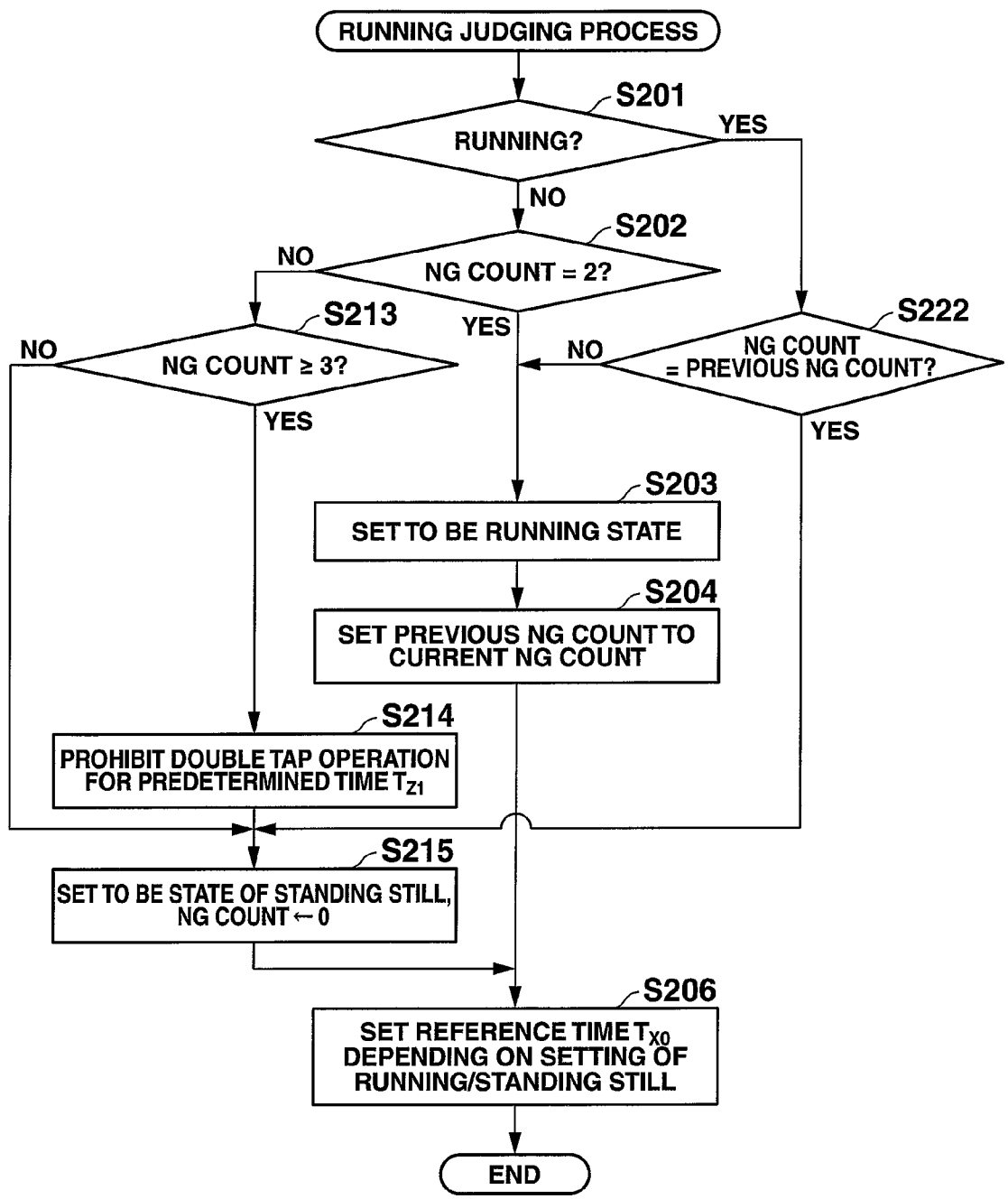
FIG. 6 is a flowchart illustrating control procedures of a running judging process.

FIG. 6 is the flowchart illustrating control procedures of a running judging process executed by the CPU 41 of the electronic watch 40 according to this embodiment.

The running judging process is executed when the running judgment program 422 is invoked, once in every one (1) second, at the timing (a second carry) of beginning of each second.

When the running judging process is started, the CPU 41 judges whether or not the current setting is the setting for the case that a user is running (Step S201). When it is judged that the current setting is for the case of running (Step S201: YES), the CPU 41 judges whether or not the current value of the NG count 431 is equal to the previous value of the NG count that is stored in the RAM 43 (Step S222). When it is judged that the current value is equal to the previous value (Step S222: YES), the processing by the CPU 41 shifts to Step S215. When it is judged that the current value is not equal to the previous value (Step S222: NO), the processing by the CPU 41 shifts to Step S203.

On the other hand, when it is judged that the current setting is not for the case of running (Step S201: NO), the CPU 41 judges whether or not the value of the NG count 431 is "two (2)" (Step S202). When it is judged that the value of the NG count 431 is "two (2)" (Step S202: YES), the processing by the CPU 41 shifts to Step S203.

When the processing shifts to Step S203, the CPU 41 changes the current setting to the setting for the case of running (Step S203), and also sets the previous value of the NG count 431 to the current value of the NG count 431 (Step S204). Then the processing by the CPU 41 shifts to Step S206.

When it is judged that the value of the NG count 431 is not "two (2)" (Step S202: NO), the CPU 41 whether or not the value of the NG count 431 is equal to or more than "three (3)" (a predetermined level) (Step S213). When it is judged that the value of the NG count 431 is equal to or more than "three (3)" (Step S213: YES), the CPU 41 prohibits the double tap operation during a predetermined prohibition period $T_{Z1}$ (second prohibition period) (Step S214). When it is judged that the value of the NG count 431 is not equal to or more than "three (3)" (Step S213: NO), namely, when the value of the NG count 431 is equal to or less than "one (1)" here, the processing by the CPU 41 shifts to Step S215.

When the processing has shifted to Step S215 from any of Steps S213, S214 and S222, the CPU 41 performs setting indicating that the current setting is setting for the case that a user is standing still, and initializes the NG count 431 so that the value thereof becomes zero (0) (Step S215). Then the processing by the CPU 41 shifts to Step S206.

When the processing has shifted to Step S206 from Step S204 or Step S215, the CPU 41 sets the reference time $T_{X0}$ depending on the setting for the case that a user is running or the case that a user is standing still. As described above, the CPU 41 sets an ordinary reference value (for example, 25 ms) as the reference time $T_{X0}$ in the case of setting for the state of standing still, and sets the reference time $T_{X0}$ (for example, 50 ms) longer than the ordinary reference value in the case of setting for the running state (Step S206). Then the CPU 41 terminates the running judging process.

As described above, the electronic watch 40 of this embodiment includes: the acceleration sensor 51 that measures the accelerations in three axial directions; and the reference value detection circuit 511 that outputs the high level signal when the measurement value of the magnitude (absolute value) of the acceleration is above the reference value A2 and when it is below the reference value A1. The CPU 41 calculates the duration times $T_{X1}$, $T_{X2}$ in the state that the acceleration is large by using the detection signals output from the reference value detection circuit 511. The CPU 41 also judges whether or not a user is in the running state, on the basis of the occurrence frequency of the state that the acceleration is large, and on the basis of the duration times $T_{X1}$, $T_{X2}$, in the running judging process which is executed every second. When the user is in the running state, the CPU 41 sets this time period (predetermined period) of one (1) second as a period during which a user is in the running state. Meanwhile, when the state that the acceleration is large is measured twice, the CPU 41 counts the time difference between the detection signals to calculate the time interval thereof, and judges whether or not the measured two states, in which the acceleration is large, are due to the continuous tap operation (double tap), on the basis of the calculated duration times $T_{X1}$, $T_{X2}$ and time interval $T_Y$. If the electronic watch 40 is in the setting for the case of running at that time, the CPU 41 changes the condition range to be used for judging the double tap so that it becomes broader than the condition range for the case that a user is not running.

Accordingly, the change in the acceleration can be easily detected in the case that there are many changes in the acceleration due to factors other than the tap operation, and in the case that the change in the acceleration relevant to the tap operation is likely to be ambiguous, under the condition in which a user is running. Meanwhile, under the condition in which a user is standing still, namely the condition in which a user is not running, misdetections can be prevented from occurring by not broadening the condition range. Thus, the double tap can be properly detected depending on the movement state of a user.

The double tap detection can be performed, without directly processing the digital value relevant to the magnitude of the measured acceleration, by the counting process using the interrupt signals obtained from the comparison result of the analog data and the reference value. Therefore, consumption power can be greatly reduced compared with the case of processing the measurement values by the CPU.

The running judgment is invoked to be performed at the predetermined intervals, especially every second, at the same time as the second carry of counting. Therefore, the processing can be executed efficiently, and consumption power can be reduced.

The reference time $T_{X0}$, which is the judgment criterion (the upper limit value of the duration time) of the tap operation in judgment based on the duration times $T_{X1}$, $T_{X2}$, is increased in the case that a user is in the running state. Thus, the detection can be performed without omission even when the tap operation during running becomes ambiguous and/or even when the arm moves more largely and for a longer time than usual.

Because the value of the increased reference time $T_{X0}$ is set so as to be shorter than each of the duration times $T_{X1}$, $T_{X2}$ measured with respect to a normal pace of traveling (jogging, running), the acceleration change due to tap operation is not confused with acceleration change due to traveling even when using the increased reference time $T_{X0}$.

In the non-running state, when NG judgment is made once, the operation corresponding to the double tap detected during the prohibition period $T_{Z0}$ is not performed. On the other hand, in the running state, the setting of the prohibition period $T_{Z0}$ is not performed. It is accordingly possible to avoid the situation that the double tap operation is not received in consequence of the acceleration change associated with running.

Each piece of the acceleration data in three axial directions is compared with the reference value, and as a result, one (1) interrupt signal is output. Thus, the processing of measurement data themselves can be reduced to be very simple processing, and most of the processing can be performed with a simple circuit configuration. Therefore, the throughput and load of the CPU are reduced, and thereby consumption power can be reduced.

The reference value A2, which is compared with the measurement values when the acceleration is increasing, is set so as to be higher than the reference value A1, which is compared with the measurement values when the acceleration is decreasing. By this, the acceleration amplitude waveform due to tapping can be more certainly distinguished from the acceleration amplitude waveform due to running in which the acceleration value is gradually decreasing.

In the case that the occurrence frequency of acceleration change, which is longer than the reference time $T_{X0}$, is higher than the predetermined level (e.g. three times per second) in the non-running state, the double tap operation is prohibited from being detected during the predetermined time period. By this, misdetections of the tap operation can be prevented from occurring when a user is in the movement state including a state of waving his/her arm(s), other than running, and thereby a detection ratio of taps can be improved.

The reference value detection circuit 511 is designed as a dedicated circuit and produced on the chip of the acceleration sensor 51, and thereby the necessary interrupt signals can be output efficiently. It therefore becomes possible to reduce the process load of the CPU 41 associated with the tap operations while improving productivity of the portable display device such as the electronic watch 40, and also possible to improve the detection ratio of the tap operations.

Second Embodiment

Next, the electronic watch 40 according to the second embodiment will be described.

The internal structure of the electronic watch 40 of the second embodiment is same as that of the electronic watch 40 of the first embodiment except for the output signals of the reference value detection circuit 511 and the contents of the operation detection program 421, so the description thereof is omitted.

Figure 7:
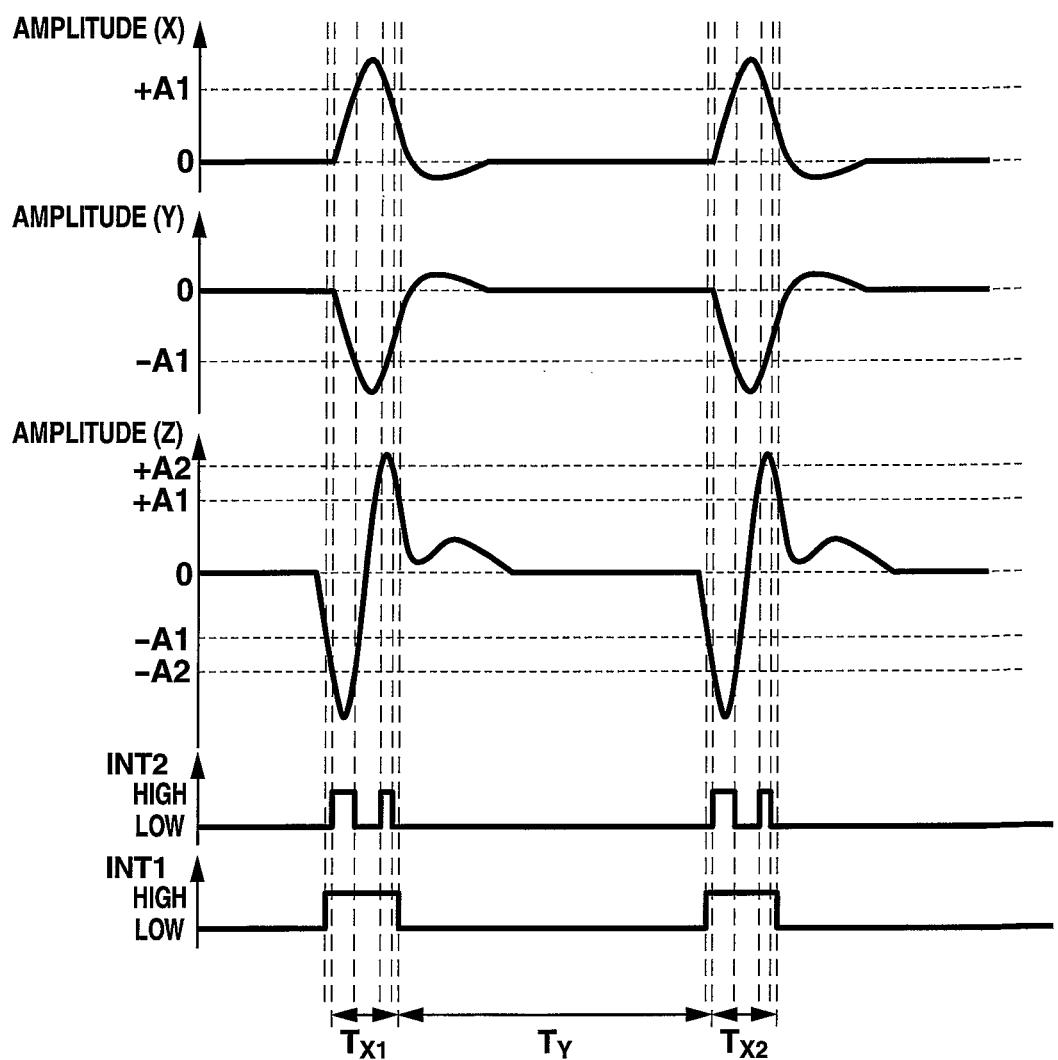
FIG. 7 is a diagram illustrating example interrupt signals output from a reference value detection circuit of the acceleration sensor according to a second embodiment.

FIG. 7 illustrates example interrupt signals output from the reference value detection circuit 511 of the acceleration sensor 51.

In the reference value detection circuit 511 of the second embodiment, the interrupt signal INT2 is high level during the period in which the measurement values of the acceleration larger than the reference value A2 are input, and the interrupt signal INT1 is high level during the period in which the measurement values of the acceleration larger than the reference value A1 are input. Thus, such reference value detection circuit 511 is easily made by using the comparators corresponding to two kinds of the reference levels, respectively.

Figure 8:
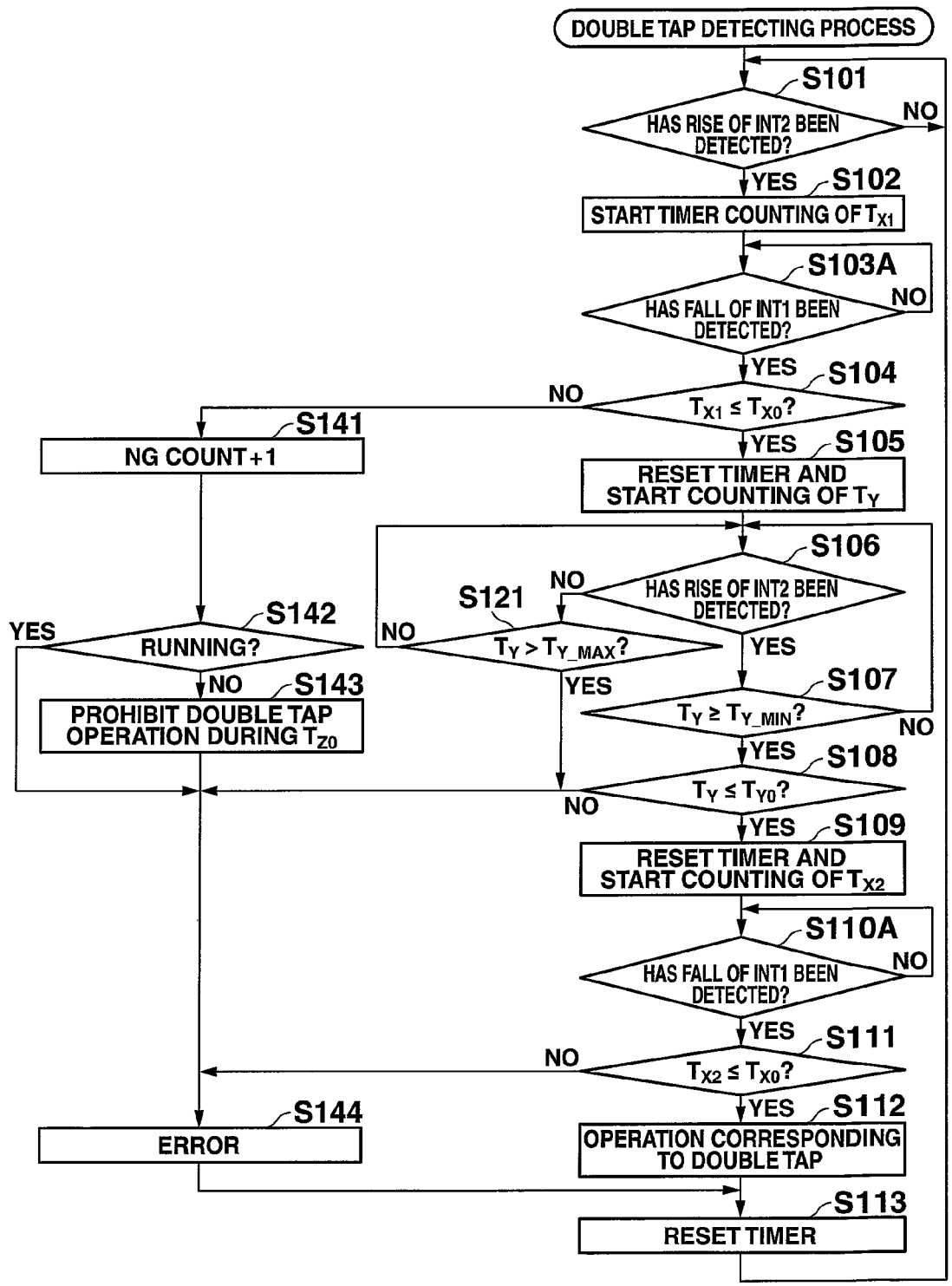
FIG. 8 is a flowchart illustrating control procedures of the double tap detecting process according to the second embodiment.

FIG. 8 is a flowchart illustrating control procedures of the double tap detecting process executed by the CPU 41 of the electronic watch 40 according to this embodiment.

This double tap detecting process is same as the double tap detecting process of the first embodiment except for the point that Step S103 and Step S110 are replaced with Step S103A and Step 110A, respectively, so the same reference letters are used for the same process contents and the detailed descriptions thereof are omitted.

After counting of the duration time $T_{X1}$ is started in the processing of Step S102, the CPU 41 judges whether or not the fall of the interrupt signal INT1 has been detected (Step S103A). When it is judged that the fall of the interrupt signal INT1 has not been detected (Step S103A: NO), the CPU 41 repeatedly performs the processing of Step S103A. When it is judged that the fall of the interrupt signal INT1 has been detected (Step S103A: YES), the processing by the CPU 41 shifts to Step S104.

Similarly, after counting of the duration time $T_{X2}$ is started in the processing of Step S109, the CPU 41 judges whether or not the fall of the interrupt signal INT1 has been detected (Step S110A). When it is judged that the fall of the interrupt signal INT1 has not been detected (Step S110A: NO), the CPU 41 repeatedly performs the processing of Step S110A. When it is judged that the fall of the interrupt signal INT 1 has been detected (Step S110A: YES), the processing by the CPU 41 shifts to Step S111.

Thus, the electronic watch 40 of this embodiment just has to measure the time periods from the timings of rises of the interrupt signal INT2 to the timings of falls of the interrupt signal INT1, as the duration times $T_{X1}$, $T_{X2}$. Although the rises of the interrupt signal INT2 occur twice in the high level section of the interrupt signal INT1, because the time interval $T_Y$ is zero (0) and less than the lower limit time $T_{Y\_MIN}$ at the timing of the second rise, the processing of Step S107 ignores the second rise similarly to the above.

Third Embodiment

Next, the electronic watch 40 of the third embodiment will be described.

The internal structure of the electronic watch 40 of the third embodiment is same as that of the electronic watch 40 of the second embodiment except for the contents of the operation detection program 421, so the description thereof is omitted.

Figure 9:
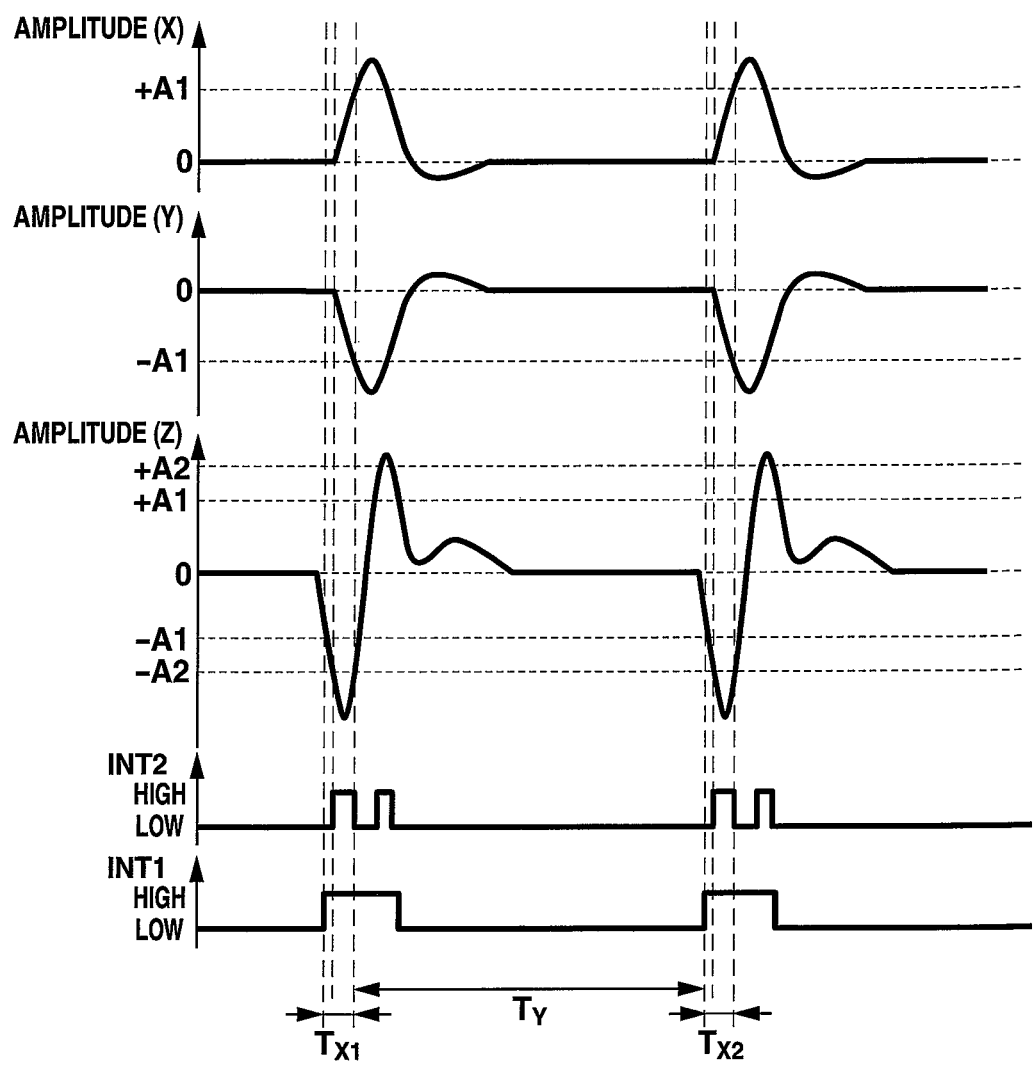
FIG. 9 is a diagram illustrating example outputs of the interrupt signals in the reference value detection circuit according to a third embodiment, and example counting of a timer.

FIG. 9 illustrates example interrupt signals in the reference value detection circuit 511 of this embodiment, and example counting by the timer.

The reference value detection circuit 511 of this embodiment outputs the same interrupt signals as those of the reference value detection circuit 511 of the second embodiment. In the double tap detecting process of this embodiment, the CPU 41 counts the time period from the rise of the interrupt signal INT1 to the fall of the interrupt signal INT2 as each of the duration times $T_{X1}$, $T_{X2}$.

Figure 10:
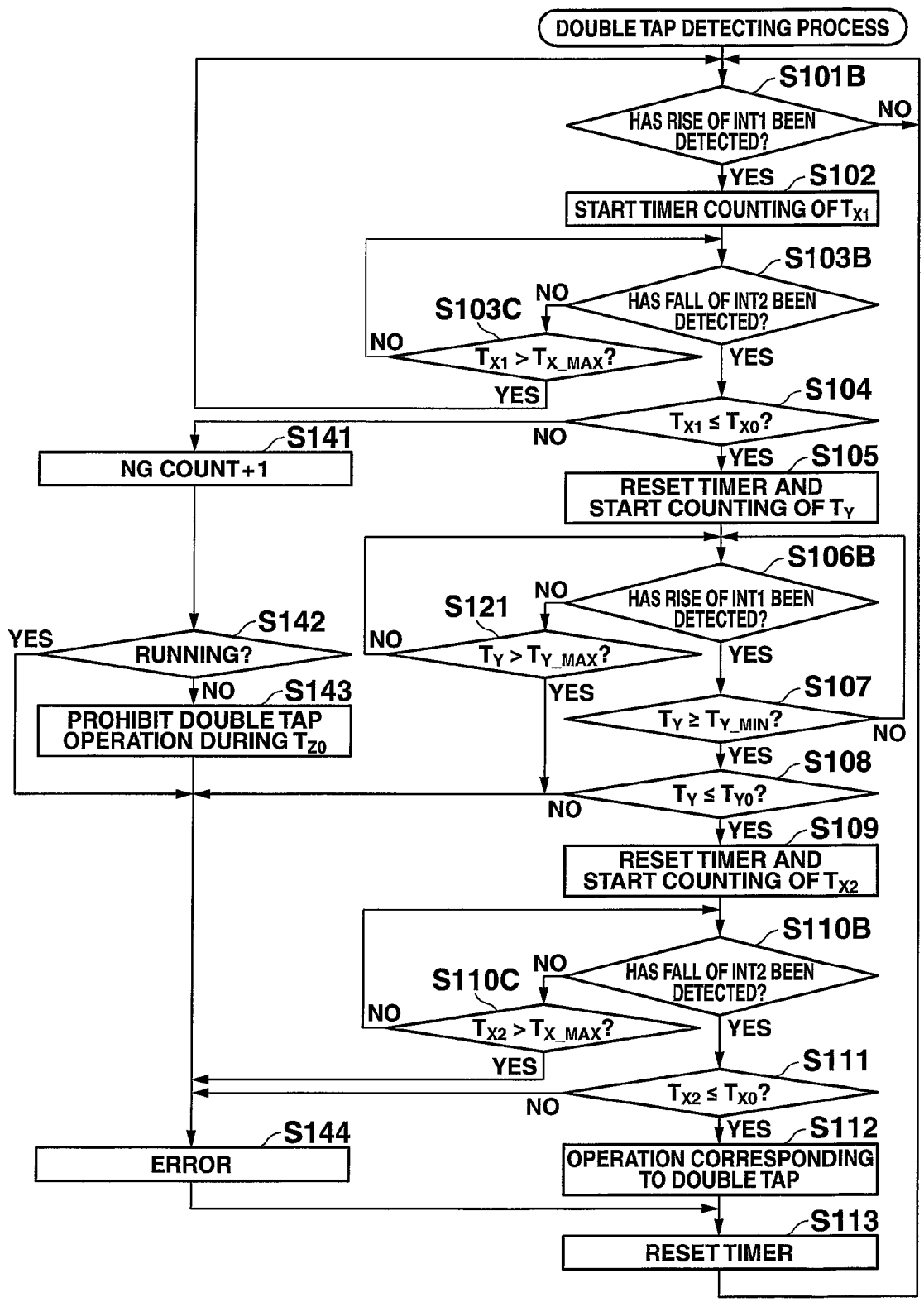
FIG. 10 is a flowchart illustrating control procedures of the double tap detecting process according to the third embodiment.

FIG. 10 is a flowchart illustrating control procedures of the double tap detecting process executed by the CPU 41 of the electronic watch 40 according to this embodiment.

This double tap detecting process is same as the double tap detecting process of the second embodiment except for the points that Steps S101, S103A, S106 and S110A are replaced with Steps S101B, S103B, S106B and S110B, respectively, and that Steps S103C and S110C are added, so the same reference letters are used for the same process contents and the detailed descriptions thereof are omitted.

When the double tap detecting process is started, the CPU 41 firstly judges whether or not the rise of the interrupt signal INT1 has been detected (Step S101B). When it is judged that the rise of the interrupt signal INT1 has not been detected (Step S101B: NO), the CPU 41 repeatedly performs the processing of Step S101B. When it is judged that the rise of the interrupt signal INT1 has been detected (Step S101B: YES), the processing by the CPU 41 shifts to Step S102.

After the counting of duration time $T_{X1}$ is started in the processing of Step S102, the CPU 41 judges whether or not the fall of the interrupt signal INT2 has been detected (Step S103B). When it is judged that the fall of the interrupt signal INT2 has not been detected (Step S103B: NO), the CPU 41 judges whether or not the duration time $T_{X1}$ exceeds an upper limit time $T_{X\_MAX}$ (Step S103C). When it is judged that the duration time $T_{X1}$ does not exceed the upper limit time $T_{X\_MAX}$ (Step S103C: NO), the processing by the CPU 41 returns to the processing of Step S103B. When it is judged that the duration time $T_{X1}$ exceeds the upper limit time $T_{X\_MAX}$ (Step S103C: YES), the processing by the CPU 41 shifts to Step S101B.

On the other hand, when it is judged that the fall of the interrupt signal INT2 has been detected (Step S103B: YES), the processing by the CPU 41 shifts to Step S104.

After counting of the time interval $T_Y$ is started (Step S105), the CPU 41 judges whether or not the rise of the interrupt signal INT1 has been detected (Step S106B). When it is judged that the rise of the interrupt signal INT1 has not been detected (Step S106B: NO), the processing by the CPU 41 shifts to Step S121. When it is judged that the rise of the interrupt signal INT1 has been detected (Step S106B: YES), the processing by the CPU 41 shifts to Step S107.

After counting of the duration time $T_{X2}$ is started in the processing of Step S109, the CPU 41 judges whether or not the fall of the interrupt signal INT2 has been detected (Step S110B). When it is judged that the fall of the interrupt signal INT2 has not been detected (Step S110B: NO), the CPU 41 judges whether or not the duration time $T_{X2}$ exceeds the upper limit time $T_{X\_MAX}$ (Step S110C). When it is judged that the duration time $T_{X2}$ does not exceed the upper limit time $T_{X\_MAX}$ (Step S110C: NO), the processing by the CPU 41 returns to the processing of Step S110B. When it is judged that the duration time $T_{X2}$ exceeds the upper limit time $T_{X\_MAX}$ (Step S110C: YES), the processing by the CPU 41 shifts to Step S144.

On the other hand, when it is judged that the fall of the interrupt signal INT2 has been detected (Step S110B: YES), the processing by the CPU 41 shifts to Step S111.

Thus, because the interrupt signal INT1 sometimes changes from high level to low level while the interrupt signal INT2 is not high level in the double tap detecting process of this embodiment, the counted duration times $T_{X1}$, $T_{X2}$ are canceled in this case.

Incidentally, in the case that the expression $T_{X2} > T_{X\_MAX}$ is satisfied and the sum of the upper limit time $T_{X\_MAX}$ and the time interval $T_Y$ is less than the upper limit time $T_{Y\_MAX}$ in Step S110C, it is possible to add the duration time $T_{X2}$ to the time interval $T_Y$ to then restart counting of the time interval $T_Y$ from the value after the addition, and return the processing to Step S106B.

As described above, in the electronic watches 40 of the second and third embodiments, the reference value detection circuit 511 outputs the interrupt signal INT1 as the output signal that becomes high level depending on the input of the measurement value of acceleration which is equal to or more than the reference value A1, and outputs the interrupt signal INT 2 as the output signal that becomes high level depending on the input of the measurement value of acceleration which is equal to or more than the reference value A2 larger than the reference value A1. When detecting the double tap, the duration times $T_{X1}$, $T_{X2}$ are counted based on the elapsed time from the rise of the interrupt signal INT1 till the fall of the interrupt signal INT2, and the time interval $T_Y$ is counted based on the elapsed time from the fall of the interrupt signal INT2 till the rise of the interrupt signal INT1. Therefore, the interrupt signals are easily generated with a simple configuration, for example a configuration provided with a comparator(s) that performs comparison with the reference voltage for detecting the double tap. The double tap detection using such configuration can be performed with low load and low power consumption.

Fourth Configuration

Next, the electronic watch 40 of the fourth embodiment will be described.

The internal structure of the electronic watch 40 of the fourth embodiment is same as that of the electronic watch 40 of the second embodiment except for the contents of the operation detection program 421, so the description thereof is omitted.

Figure 11:
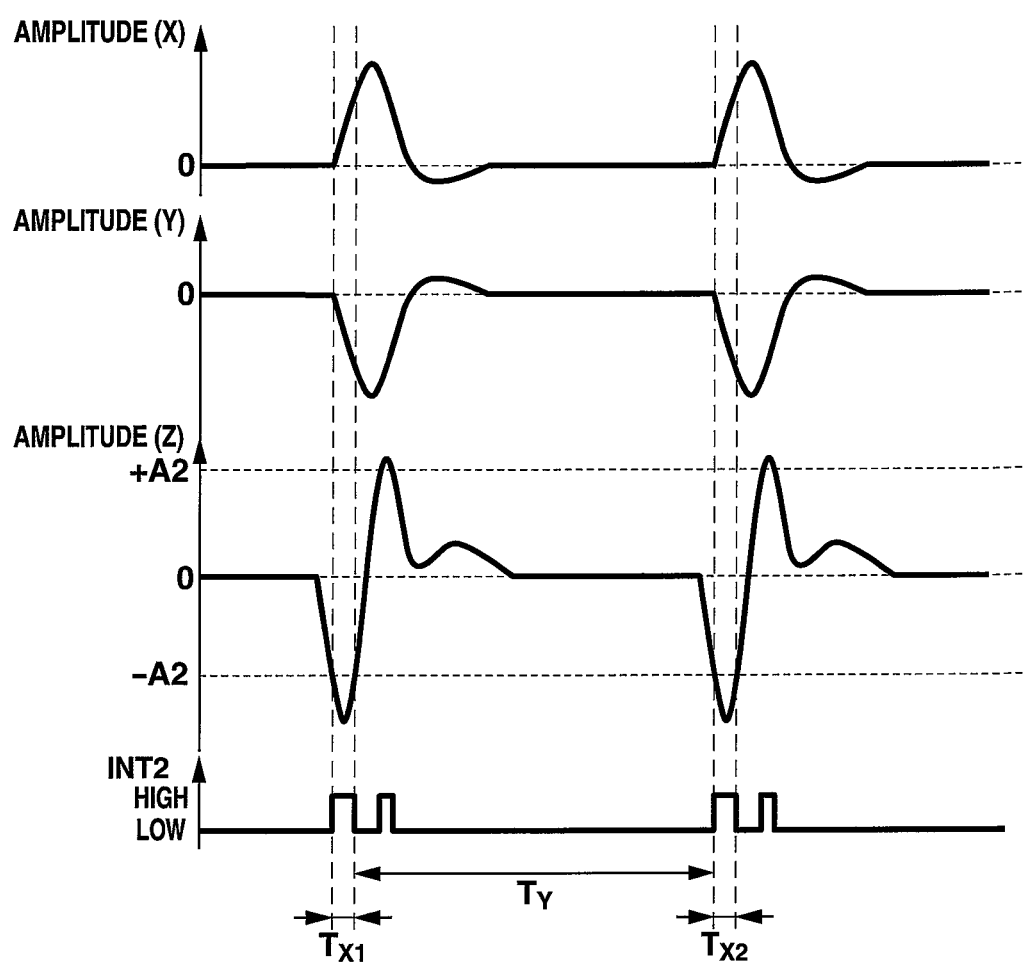
FIG. 11 is a diagram illustrating example outputs of the interrupt signals in the reference value detection circuit according to a fourth embodiment, and example counting of a timer.

FIG. 11 illustrates example outputs of the interrupt signals in the reference value detection circuit 511 of this embodiment, and example counting by the timer.

The reference value detection circuit 511 of this embodiment outputs the same interrupt signals as those of the reference value detection circuit 511 of the second embodiment. In the double tap detecting process of this embodiment, the CPU 41 uses only the interrupt signal INT2 to count the time period from the rise of the interrupt signal INT2 till the fall of the interrupt signal INT2 as the duration times $T_{X1}$, $T_{X2}$.

Figure 12:
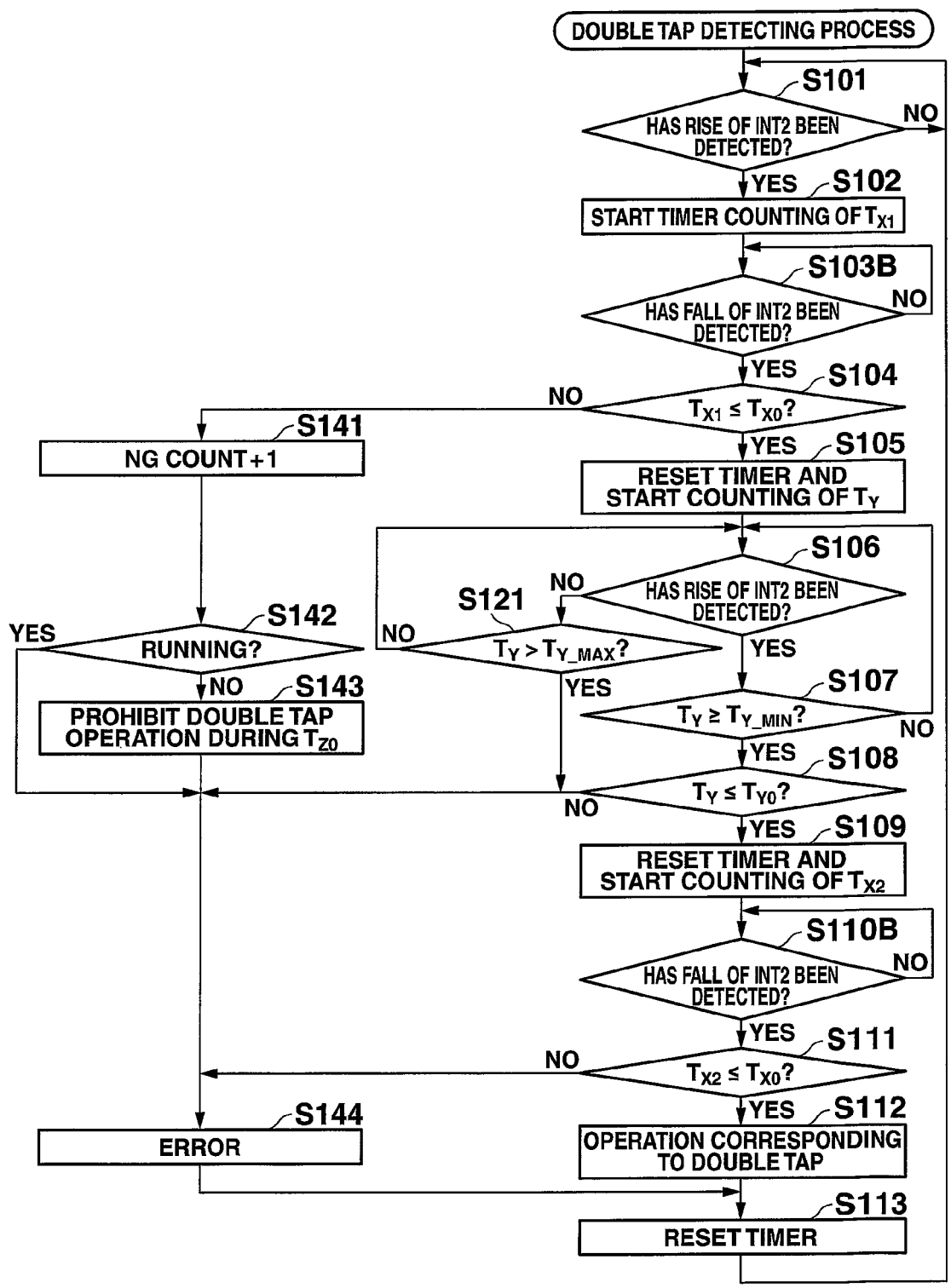
FIG. 12 is a flowchart illustrating control procedures of the double tap detecting process of the fourth embodiment.

FIG. 12 is a flowchart illustrating control procedures of the double tap detecting process executed by the CPU 41 of the electronic watch 40 according to this embodiment.

The double tap detecting process is same as the double tap detecting process of the second embodiment except for the point that Steps S103A and S110A are replaced with Steps S103B and S110B, respectively, so the same reference letters are used for the same process contents and the detailed descriptions thereof are omitted.

After counting of the duration time $T_{X1}$ is started in the processing of Step S102, the CPU 41 judges whether or not the fall of the interrupt signal INT2 has been detected (Step S103B). When it is judged that the fall of the interrupt signal INT2 has not been detected (Step S103B: NO), the CPU 41 repeatedly performs the processing of Step S103B. When it is judged that the fall of the interrupt signal INT2 has been detected (Step S103B: YES), the processing by the CPU 41 shifts to Step S104.

Similarly, after counting of the duration time $T_{X2}$ is started, the CPU 41 judges whether or not the fall of the interrupt signal INT 2 has been detected (Step S110B). When it is judged that the fall of the interrupt signal INT2 has not been detected (Step S110B: NO), the CPU 41 repeatedly performs the processing of Step S110B. When it is judged that the fall of the interrupt signal INT2 has been detected (Step S110B: YES), the processing by the CPU 41 shifts to Step S111.

Thus, the electronic watch 40 of this embodiment uses only the interrupt signal INT2 for counting the duration times $T_{X1}$, $T_{X2}$ and the time interval $T_Y$. Therefore, power consumption is not necessary for generating and outputting the interrupt signal INT1, and the double tap detection can be performed more easily.

Fifth Embodiment

Next, the electronic watch 40 of the fifth embodiment will be described.

The electronic watch 40 of the fifth embodiment is same as the electronic watch 40 of the first embodiment except for the contents of the operation detection program 421, so the description thereof is omitted.

Figure 13:
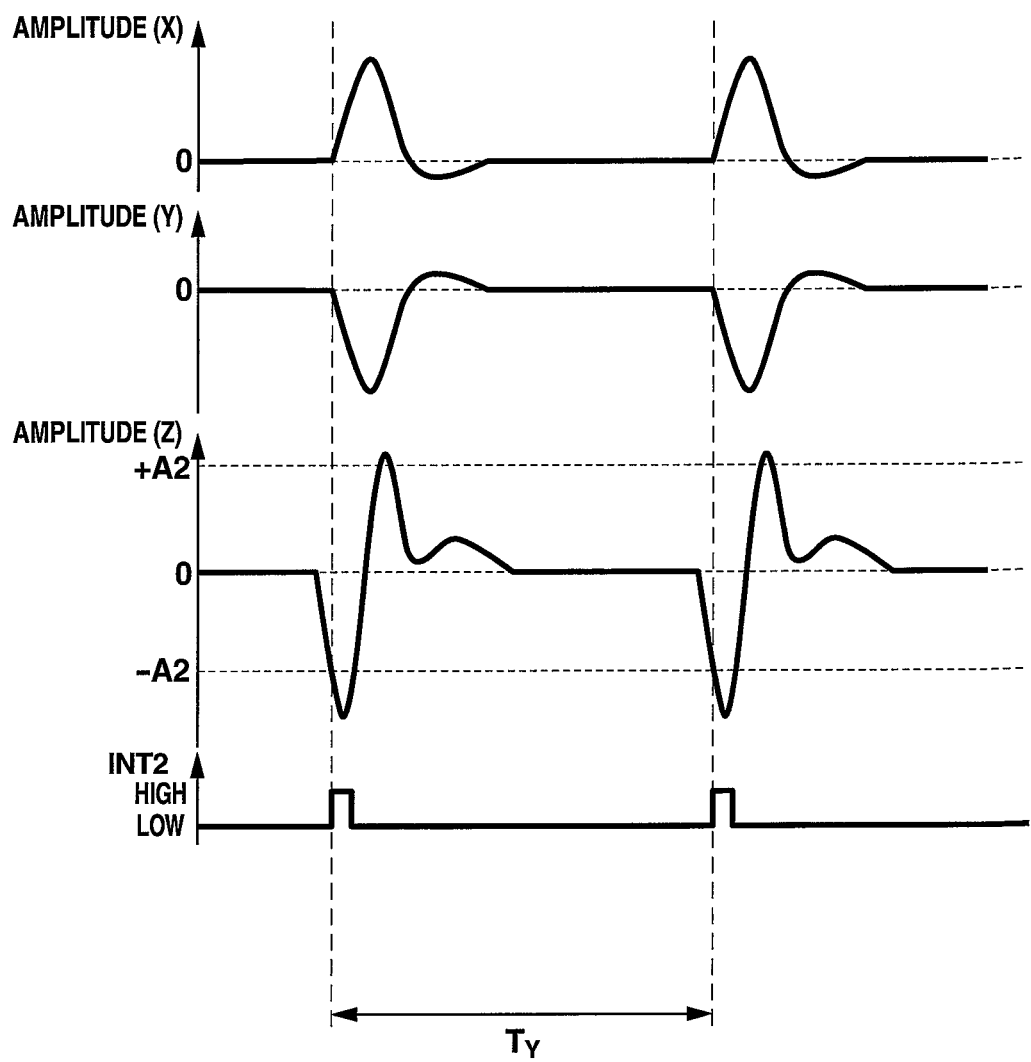
FIG. 13 is a diagram for explaining about double tap detection based on the interrupt signals output from the reference value detection circuit of a fifth embodiment.

FIG. 13 is a diagram for explaining about the double tap detection based on the interrupt signals output from the reference value detection circuit 511 of the acceleration sensor 51.

The acceleration sensor 51 uses only the interrupt signal INT2 relevant to one (1) reference value A2 for discriminating the double tap during running. This interrupt signal INT2 is, similarly to the interrupt signal INT2 of the first embodiment, a pulse waveform signal that becomes high level for the predetermined time when the magnitude of the measurement value of acceleration in any of the three directions exceeds the reference value A2. Alternatively, the interrupt signal INT2 may be, similarly to the interrupt signal INT2 of the second embodiment, a signal that becomes high level during the time period in which the magnitude of the acceleration in any of the three direction is larger than the reference value A2, and becomes low level in other cases.

Meanwhile, the interrupt signal INT1, which is not illustrated, is used for judging the running-state, and for judging the double tap in the non-running state.

Figure 14:
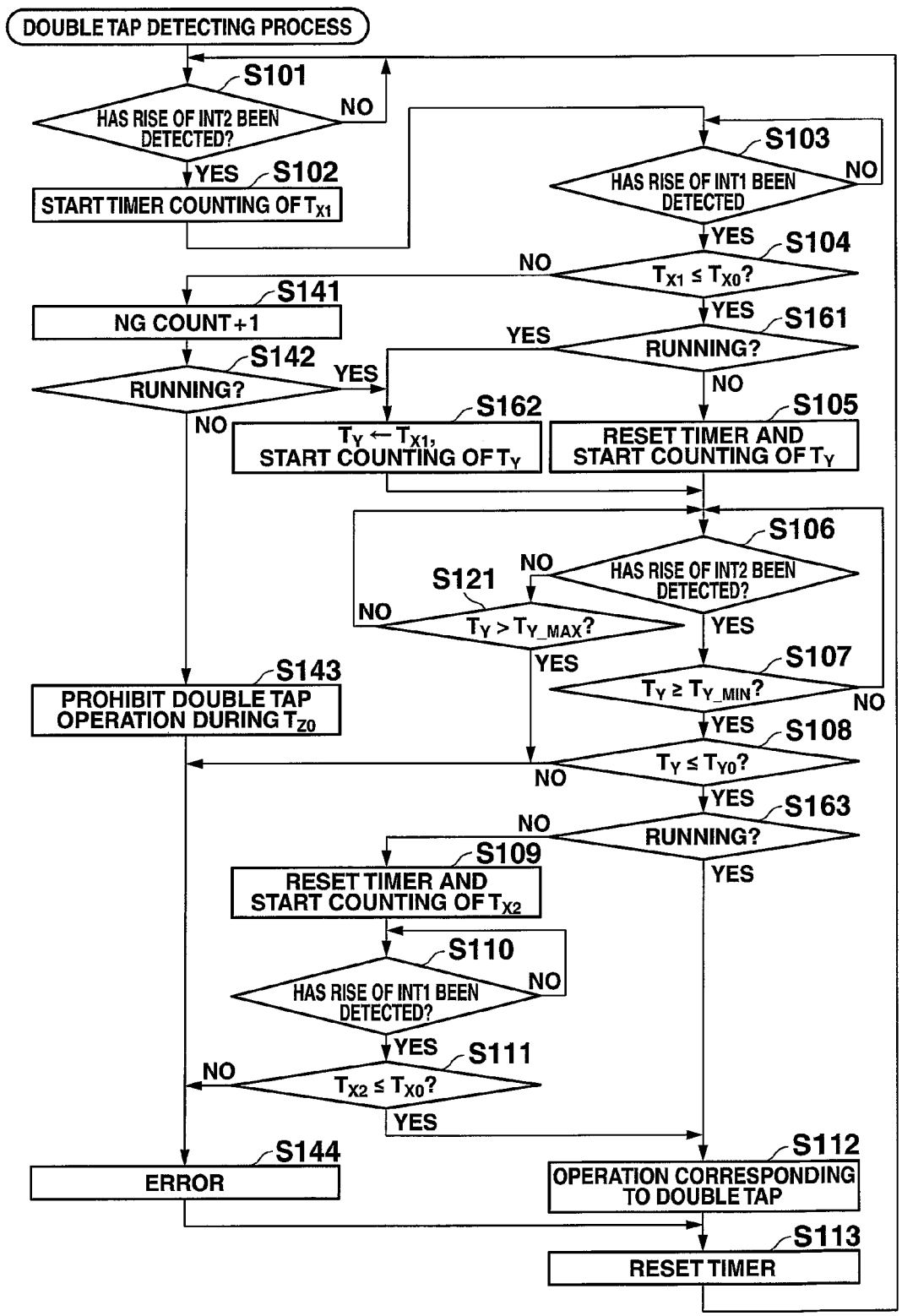
FIG. 14 is a flowchart illustrating control procedures of the double tap detecting process of the fifth embodiment.

FIG. 14 is a flowchart illustrating control procedures of the double tap detecting process executed by the CPU 41 of the electronic watch 40 of this embodiment.

The double tap detecting process of this embodiment is same as the double tap detecting process of the first embodiment except for the points that Steps S161 to S163 are added to the double tap detecting process of the first embodiment, and that the order of control is partially changed, so the same reference letters are used for the same process contents and the detailed descriptions thereof are omitted.

When it is judged that the duration time $T_{X1}$ is equal to or less than the reference time $T_{X0}$ in the judging process of Step S104 (Step S104: YES), the CPU 41 then judges whether or not a user is in the running state (Step S161). When it is judged that the user is not in the running state (Step S161: NO), the processing by the CPU 41 shifts to Step S105. When it is judged that the user is in the running state (Step S161: YES), the processing by the CPU 41 shifts to Step S162.

When it is judged that the user is running in judgment on whether or not the user is in the running state in the processing of Step S142 (Step S142: YES), the processing by the CPU 41 shifts to Step S162.

When the processing shifts to Step S162, the CPU 41 assigns the duration time $T_{X1}$ to the time interval $T_Y$, and causes the timer to start counting from the time interval $T_Y$ (Step S162). Then, the processing by the CPU 41 shifts to Step S106.

When it is judged that the time interval $T_Y$ is equal to or less than the reference time $T_{Y0}$ in the judging process of Step S108 (Step S108: YES), the CPU 41 judges whether or not a user is in the running state (Step S163). When it is judged that the user is in the running state (Step S163: YES), the processing by the CPU 41 shifts to Step S112. When it is judged that the user is not in the running state (Step S163: NO), the processing by the CPU 41 shifts to Step S109.

Thus, in the double tap detecting process of this embodiment, the CPU 41 counts the time period from the rise of the first interrupt signal INT2 till the rise of the second interrupt signal INT2 as the time interval $T_Y$. The judgment criterion for detection is lowered only when a user is in the running state, and therefore the double tap detection can be easily performed.

Incidentally, at that time, the reference value A2 and/or the reference time $T_{Y0}$ can be properly adjusted in order to reduce confusion with acceleration detection due to running of the user.

Sixth Embodiment

Next, the electronic watch 40 of the sixth embodiment will be described.

The interval structure of the electronic watch 40 is same as the electronic watch 40 of the second embodiment except for the contents of the operation detection program 421, so the description thereof is omitted.

Figure 15:
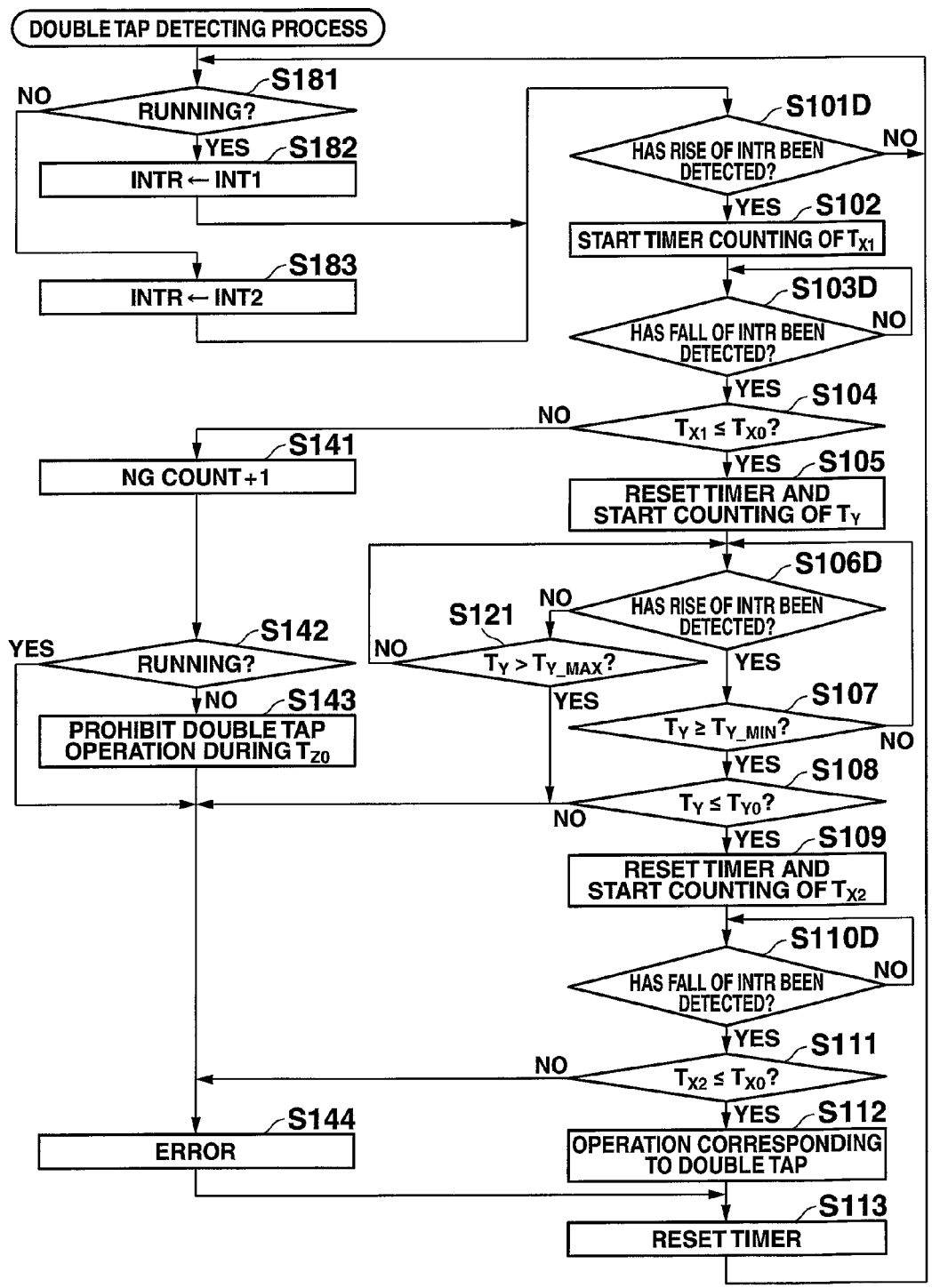
FIG. 15 is a flowchart illustrating control procedures of the double tap detecting process of the sixth embodiment.

FIG. 15 is a flowchart illustrating control procedures of the double tap detecting process executed by the CPU 41 of the electronic watch 40 of this embodiment.

This double tap detecting process is same as the double tap detecting process of the second embodiment except for the points that Steps S181 to S183 are added, and that Steps S101, S103A, S106 and S110A are replaced with Steps S101D, S103D, S106D and S110D, respectively, so the same reference letters are used for the same process contents and the detailed descriptions thereof are omitted.

When the double tap detecting process is started, the CPU 41 firstly judges whether or not a user is in the running state (Step S181). When it is judged that the user is in the running state (Step S181: YES), the CPU 41 selects the interrupt signal INT1 as a to-be-used interrupt signal INTR (Step S182). Then, the processing by the CPU 41 shifts to Step S101D.

On the other hand, when it is judged that the user is not in the running state (Step S181: NO), the CPU 41 selects the interrupt signal INT2 as the to-be-used interrupt signal INTR (Step S183). Then, the processing by the CPU 41 shifts to Step S101D.

When the processing shifts to Step S101D, the CPU 41 judges whether or not the rise of the selected interrupt signal INTR has been detected (Step S101D). When it is judged that the rise of the selected interrupt signal INTR has not been detected (Step S101D: NO), the processing by the CPU 41 returns to Step S181. When it is judged that the rise of the selected interrupt signal INTR has been detected (Step S101D: YES), the processing by the CPU 41 shifts to Step S102.

Incidentally, in the case that the flowchart branches to "NO" in the judging process of Step S101D, the CPU 41 may repeatedly performs the processing of Step S101D in a normal state and makes the processing return to Step S181 at predetermined intervals.

When counting of the duration time $T_{X1}$ is started in the processing of Step S102, the CPU 41 judges whether or not the fall of the selected interrupt signal INTR has been detected (Step S103D). When it is judged that the fall of the selected interrupt signal INTR has not been detected (Step S103D: NO), the CPU 41 repeatedly performs the processing of Step S103D. When it is judged that the fall of the selected interrupt signal INTR has been detected (Step S103D: YES), the processing by the CPU 41 shifts to Step S104.

When counting of the time interval $T_Y$ is started in the processing of Step S105, the CPU 41 judges whether or not the rise of the selected interrupt signal INTR has been detected (Step S106D). When it is judged that the rise of the selected interrupt signal INTR has not been detected (Step S106D: NO), the processing by the CPU 41 shifts to Step S121. When it is judged that the rise of the selected interrupt signal INTR has been detected (Step S106D: YES), the processing by the CPU 41 shifts to Step S107.

When counting of the duration time $T_{X2}$ is started in the processing of Step S109, the CPU 41 judges whether or not the fall of the selected interrupt signal INTR has been detected (Step S110D). When it is judged that the fall of the selected interrupt signal INTR has not been detected (Step S110D: NO), the CPU 41 repeatedly performs the processing of Step S110D. When it is judged that the fall of the selected interrupt signal INTR has been detected (Step S110D: YES), the processing by the CPU 41 shifts to Step S111.

As described above, the electronic watch 40 of the six embodiment detects the rises and falls of the interrupt signals based on the different reference values depending on whether a user is in the running state or the non-running state. Concretely, in the non-running state, similarly to the example illustrated in FIG. 11, the rises and falls of the interrupt signal INT2 relevant to the reference value A2 are detected. In the running state, the rises and falls of the interrupt signal INT1 relevant to the reference value A1, which is smaller than the reference value A2, are detected. Therefore, the double tap operation can be easily detected even in the cases that the tap operation becomes ambiguous when a user is running, that the electronic watch 40 becomes unsteadier or more inclined in any of the axial directions at the time of tap operation compared with the case of the non-running state, and/or that the accelerations cancel each other due to arm swings and/or up-and-down motions of a body.

Moreover, especially, by previously providing interrupt signal outputs relevant to two preset reference values and selectively using any of them, switching process can be easily performed.

Seventh Embodiment

Next, the electronic watch 40 of the seventh embodiment will be described.

The internal structure of the electronic watch 40 of the seventh embodiment is same as that of the electronic watch 40 of the first embodiment except for the output signals of the reference value detection circuit 511 and the contents of the operation detection program 421, so the description thereof is omitted.

The reference value detection circuit 511 of this embodiment has two sets of interrupt signals INT1, INT2 including: a set of interrupt signals INT2L, INT2H relevant to a large acceleration amplitude; and a set of interrupt signals INT1L, INT1H relevant to a small acceleration amplitude. In other words, in this embodiment, the reference value A2 relevant to the interrupt signal INT2H is larger than the reference value A2 relevant to the interrupt signal INT1H, and the reference value A1 relevant to the interrupt signal INT2L is larger than the reference value A1 relevant to the interrupt signal INT1L.

Figure 16:
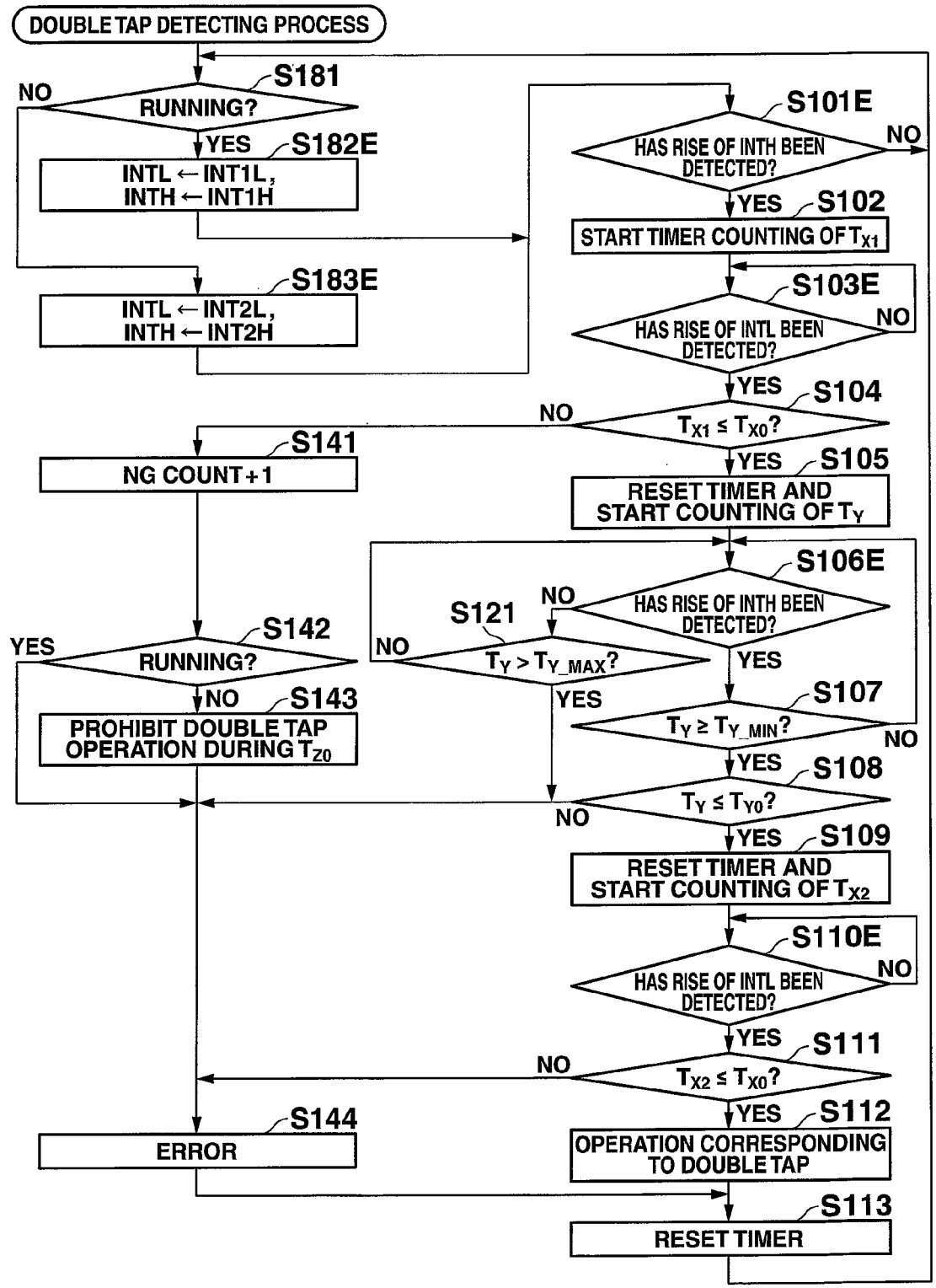
FIG. 16 is a flowchart illustrating control procedures of the double tap detecting process of the seventh embodiment.

FIG. 16 is a flowchart illustrating control procedures of the double tap detecting process executed by the CPU 41 of the electronic watch 40 of this embodiment.

This double tap detecting process is same as the double tap detecting process of the first embodiment except for the points that Steps S181, S182E and S183E are added, and that Steps S101, S103, S106 and S110 are replaced with Steps S101E, S103E, S106E and S110E, respectively, so the same reference letters are used for the same process contents and the detailed descriptions thereof are omitted.

When the double tap detecting process is started, the CPU 41 firstly whether or not a user is in the running state (Step S181). When it is judged that the user is in the running state (Step S181: YES), the CPU 41 selects the interrupt signals INT1H, INT1L relevant to the small acceleration amplitude and sets them as the interrupt signals INTH, INTL, respectively (Step S182E). Then, the processing by the CPU 41 shifts to Step S101E.

On the other hand, when it is judged that the user is not in the running state (Step S181: NO), the CPU 41 selects the interrupt signals INT2H, INT2L relevant to the large acceleration amplitude and sets them as the interrupt signals INTH, INTL, respectively (Step S183E). Then, the processing by the CPU 41 shifts to Step S101E.

When the processing shifts to Step S101E, the CPU 41 judges whether or not the rise of the selected interrupt signal INTH has been detected (Step S101E). When it is judged that the rise of the selected interrupt signal INTH has not been detected (Step S101E: NO), the processing by the CPU 41 returns to Step S181. When it is judged that the rise of the selected interrupt signal INTH has been detected (Step S101E: YES), the processing by the CPU 41 shifts to Step S102.

When counting of the duration time $T_{X1}$ is started in the processing of Step S102, the CPU 41 judges whether or not the rise of the selected interrupt signal INTL has been detected (Step S103E). When it is judged that the rise of the selected interrupt signal INTL has not been detected (Step S103E: NO), the CPU 41 repeatedly perform the processing of Step S103E. When it is judged that the rise of the selected interrupt signal INTL has been detected (Step S103E: YES), the processing by the CPU 41 shifts to Step S104.

When counting of the time interval $T_Y$ is started in Step S105, the CPU 41 judges whether or not the rise of the selected interrupt signal INTH has been detected (Step S106E). When it is judged that the rise of the selected interrupt signal INTH has not been detected (Step S106E: NO), the processing by the CPU 41 shifts to Step S121. When it is judged that the rise of the selected interrupt signal INTH has been detected (Step S106E: TES), the processing by the CPU 41 shifts to Step S107.

When counting of the duration time $T_{X2}$ is started in the processing of Step S109, the CPU 41 judges whether or not the rise of the selected interrupt signal INTL has been detected (Step S110E). When it is judged that the rise of the selected interrupt signal INTL has not been detected (Step S110E: NO), the CPU 41 repeatedly performs the processing of Step S110E. When it is judged that the rise of the selected interrupt signal INTL has been detected (Step S110E: YES), the processing by the CPU 41 shifts to Step S111.

As described above, the electronic watch 40 of the seventh embodiment detects the rises and falls of the interrupt signals INTH, INTL based on the different reference values depending on whether a user is in the running state or in the non-running state. In other words, the values of the reference values A1, A2 in the example illustrated in FIG. 4 differ depending on whether a user is in the running state or in the non-running state. Therefore, the double tap operation can be easily detected even in the cases that the tap operation becomes ambiguous when a user is running, and/or that the electronic watch 40 becomes unsteadier or more inclined in any of the axial directions at the time of tap operation compared with the case of the non-running state.

Eighth Embodiment

Next, the electronic watch 40 of the eighth embodiment will be described.

The internal structure of the electronic watch 40 of the eighth embodiment is same as that of the electronic watch 40 of the second embodiment except for the output signals of the reference value detection circuit 511 and the contents of the operation detection program 421 and the running judgment program 422, so the description thereof is omitted.

Figure 17A:
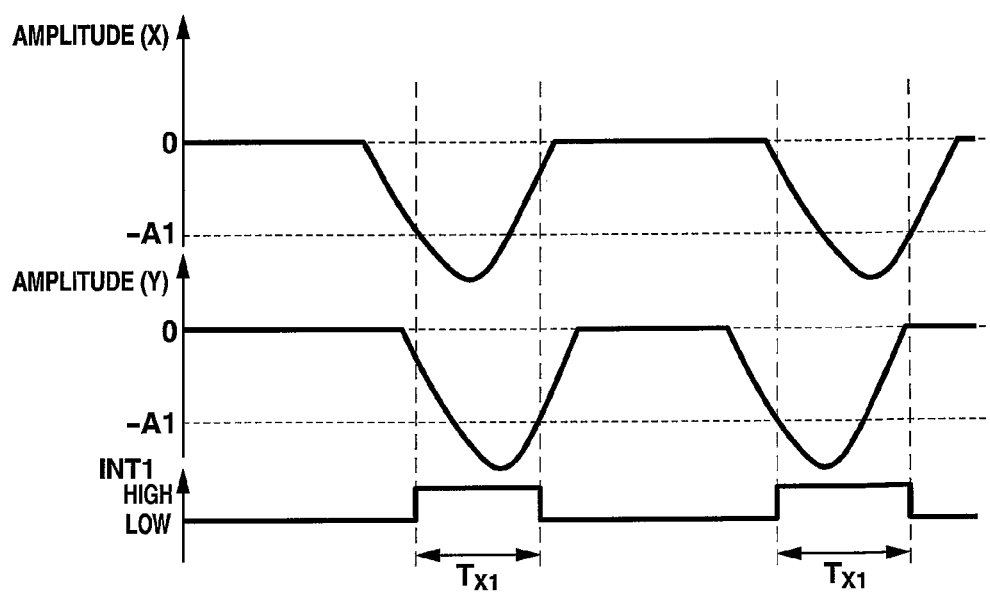
FIGS. 17A and 17B are diagrams for explaining about the interrupt signals output from the reference value detection circuit of an eighth embodiment, and detections of running states and double taps.
Figure 17B:
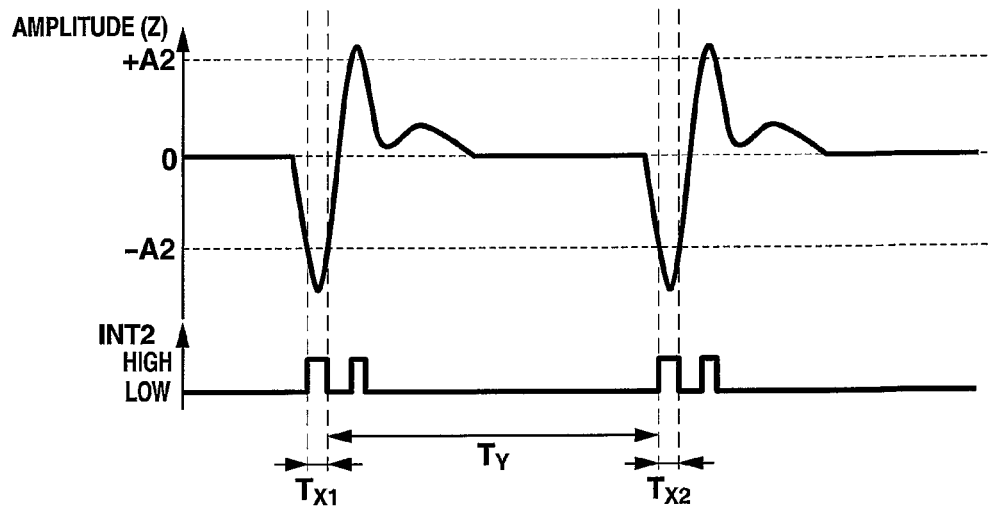

FIGS. 17A and 17B are diagrams for explaining about the interrupt signals output from the reference detection circuit 511 of the acceleration sensor 51, and detections of the running state and the double tap based on these interrupt signals.

In the reference value detection circuit 511 (a vertical acceleration detection signal outputting section, a parallel acceleration detection signal outputting section), the interrupt signal INT1 is generated depending on a magnitude relation between the reference value and the larger value (amplitude of a parallel acceleration) among the acceleration amplitude in X direction and the acceleration amplitude in Y direction. The interrupt signal INT2 is generated depending on a magnitude relation between the reference value and the amplitude of acceleration (vertical acceleration) in Z direction.

As described above, the acceleration change relevant to the tap operation mainly occurs in the measurement value in Z direction. Therefore, as illustrated in FIG. 17B, the interrupt signal INT2 is output as the waveform same as that of the interrupt signal INT2 in the non-running state of the second embodiment (see FIG. 7).

Meanwhile, the acceleration change due to running, mainly due to arm swing by a user, occurs in the direction parallel to the display screen, namely in the measurement values within an X-Y plain. Therefore, as illustrated in FIG. 17A, the interrupt signal INT1 becomes the signal in which high-level states, each having longer duration compared with that of the interrupt signal INT2, periodically occur depending on the acceleration change due to running. The reference values A1, A2 at that time can be individually set to proper values.

Figure 18:
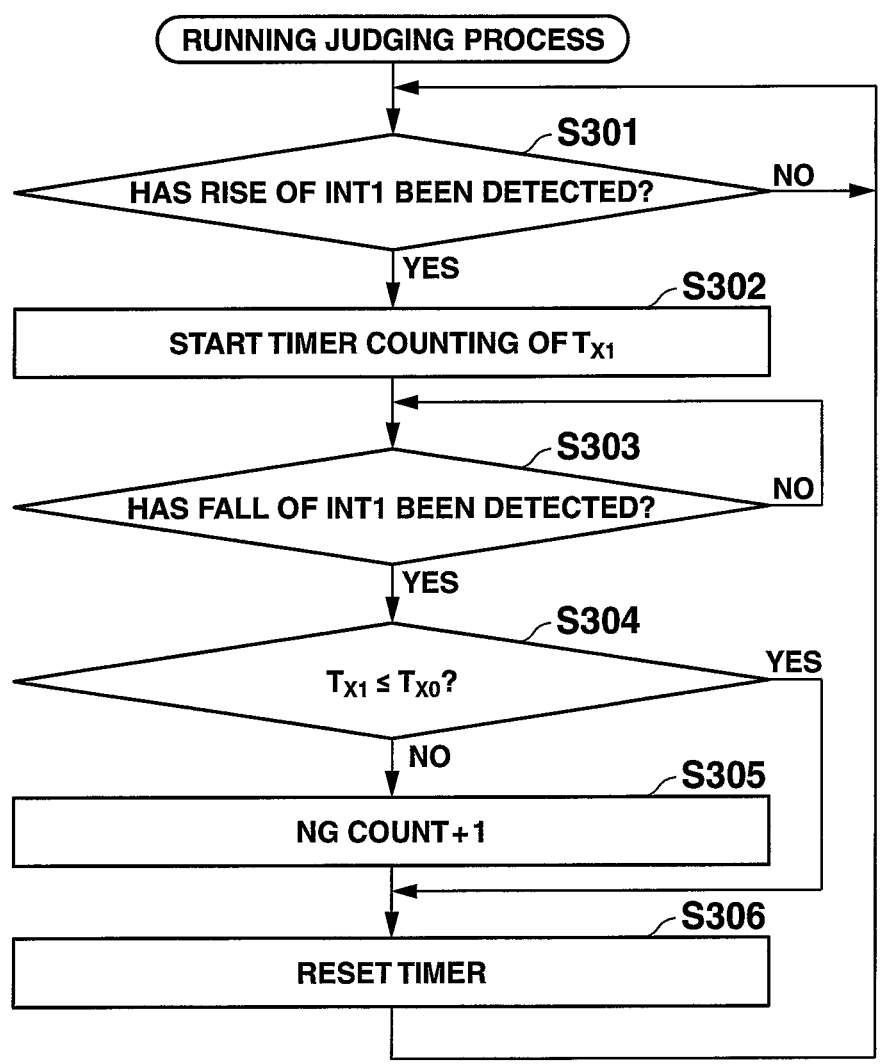
FIG. 18 is a flowchart illustrating control procedures of a running detecting process of the eighth embodiment.
Figure 19:
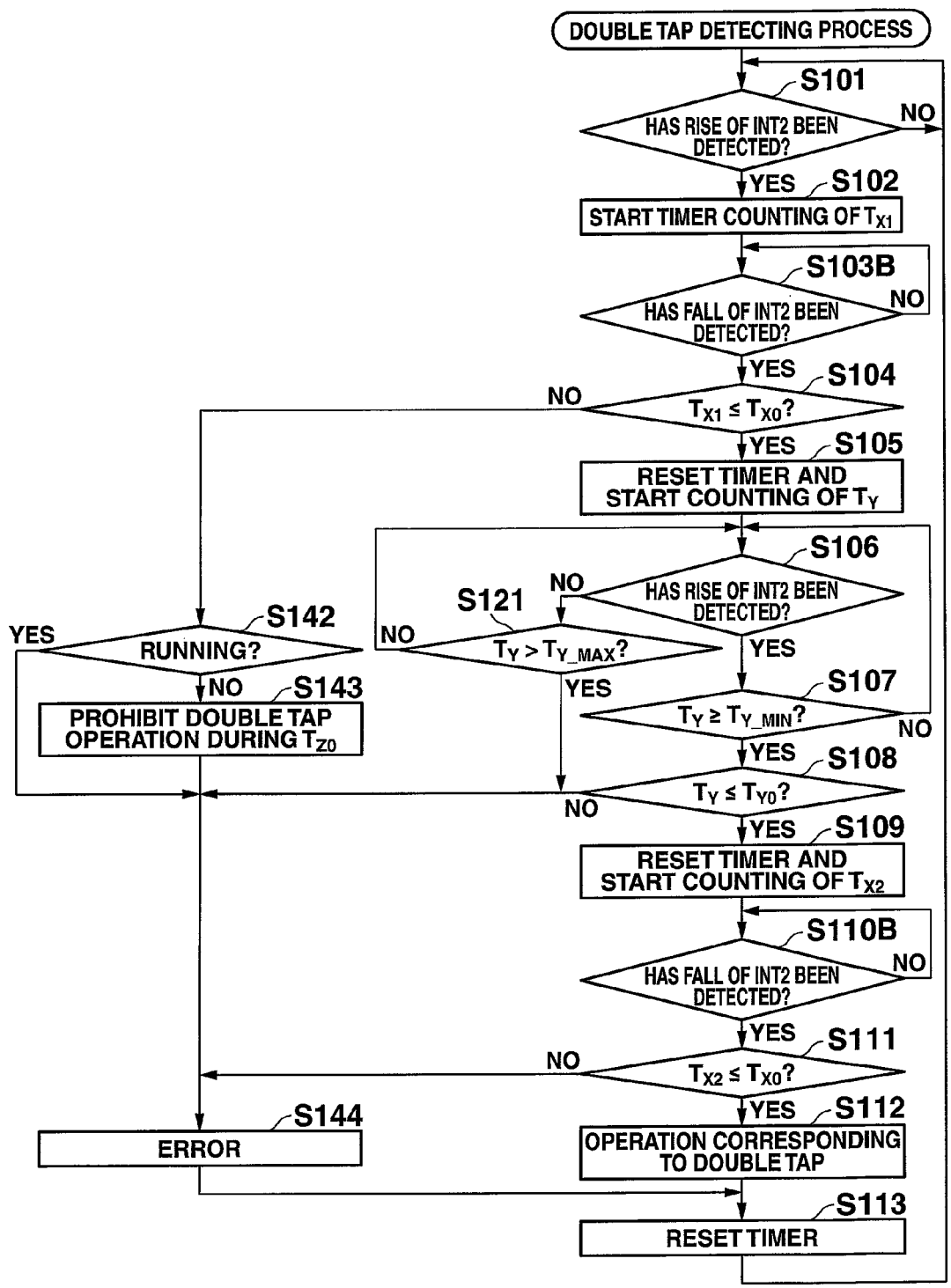
FIG. 19 is a flowchart illustrating control procedures of the double tap detecting process of the eighth embodiment.

FIG. 18 is a flowchart illustrating control procedures of the running detecting process executed by the CPU 41 of the electronic watch 40 of this embodiment. FIG. 19 is a flowchart illustrating control procedures of the double tap detecting process executed by the CPU 41.

The electronic watch 40 of this embodiment executes the detecting process of the interrupt signals relevant to acceleration change during running, as the running detecting process, separately from the double tap detecting process. This results in the difference of this double tap detecting process from the double tap detecting process of the second embodiment. Concretely, the processing of Step S141 is removed, and Steps S103A and S110A are replaced with Steps S103B and S110B. Other processes are same as those of the double tap detecting process of the second embodiment, so the same reference letters are used and the descriptions thereof are omitted.

The running detecting process is stored in the ROM 42 as one of the running judgment programs 422, and invoked to be resident in the RAM 43, under the setting in which the tap input is possible, to be executed.

When the running detecting process is started, as illustrated in FIG. 18, the CPU 41 judges whether or not the rise of the interrupt signal INT1 has been detected (Step S301). When it is judged that the rise of the interrupt signal INT1 has not been detected (Step S301: NO), the CPU 41 repeatedly performs the processing of Step S301.

When it is judged that the rise of the interrupt signal INT1 has been detected (Step S301: YES), the CPU 41 causes the timer to operate to start counting of the duration time $T_{X1}$ (Step S302). The CPU 41 then judges whether or not the fall of the interrupt signal INT1 has been detected (Step S303). When it is not judged that the fall of the interrupt signal INT1 has not been detected (Step S303: NO), the CPU 41 repeatedly performs the processing of Step S303.

When it is judged that the fall of the interrupt signal INT1 has been detected (Step S303: YES), the CPU 41 judges whether or not the duration time $T_{X1}$ is equal to or less than the reference time $T_{X0}$ (Step S304). When it is judged that the duration time $T_{X1}$ is equal to or less than the reference time $T_{X0}$ (Step S304: YES), the processing by the CPU 41 shifts to Step S306. When it is judged that the duration time $T_{X1}$ is not equal to or less than the reference time $T_{X0}$ (Step S304: NO), the CPU 41 adds one (1) to the value of the NG count 431 (Step S305), then makes the processing shift to Step S306.

When the processing shifts to Step S306, the CPU 41 resets the timer (Step S306), and then makes the processing return to Step S301.

On the other hand, in the double tap detecting process, as illustrated in FIG. 19, after counting of the duration time $T_{X1}$ is started in the processing of Step S102, the CPU 41 judges whether or not the fall of the interrupt signal INT2 has been detected (Step S103B). When it is judged that the fall of the interrupt signal INT2 has not been detected (Step S103B: NO), the CPU 41 repeatedly performs the processing of Step S103B. When it is judged that the fall of the interrupt signal INT2 has been detected (Step S103B: YES), the processing by the CPU 41 shifts to Step S104.

Similarly, after counting of the duration time $T_{X2}$ is started in the processing of Step S109, the CPU 41 judges whether or not the fall of the interrupt signal INT2 has been detected (Step S110B). When it is judged that the fall of the interrupt signal INT2 has not been detected (Step S110B: NO), the CPU 41 repeatedly performs the processing of Step S110B. When it is judged that the fall of the interrupt signal INT2 has been detected (Step S110B: YES), the processing by the CPU 41 shifts to Step S111.

When it is judged that the duration time $T_{X1}$ is not equal to or less than the reference time $T_{X0}$ in the judging process of Step S104 (Step S104: NO), the processing by the CPU 41 shifts to Step S142.

As described above, in the electronic watch 40 of the eighth embodiment, the reference value detection circuit 511 generates and outputs the interrupt signal INT1, which is generated depending on the X-direction acceleration and Y-direction acceleration, and the interrupt signal INT2, which is generated depending on the Z-direction acceleration. The running state is judged by the running detecting process and the running judging process using the interrupt signal INT1, and only the double tap detection is performed by the double tap detecting process using the interrupt signal INT2. Therefore, the double tap detection can be more surely performed in the running state by separating the acceleration change due to double tapping from the acceleration change due to running. Moreover, because the judgment criterion for double tap detection is lowered during running also in this case, the detection ratio of the tap operation in the running state can be improved without increasing misdetections in the non-running state.

Especially, in the case of detecting the tap operation for stopping the announcement operations by the vibration generating section 52 and/or the buzzer section 54, which can be recognized by a user without seeing the display screen, while keeping the posture in which a user does not see the display screen, the tap operation can be more effectively detected by separating the waveform relevant to tapping from the waveform relevant to running in the acceleration amplitude waveforms of the axial directions.

Ninth Embodiment

Next, the electronic watch 40 of the ninth embodiment will be described.

The internal structure of the electronic watch 40 of the ninth embodiment is same as that of the electronic watch 40 of the eighth embodiment except for the output signals of the reference value detection circuit 511 and the contents of the operation detection program 421 and the running judgment program 422, so the description thereof is omitted.

Figure 20A:
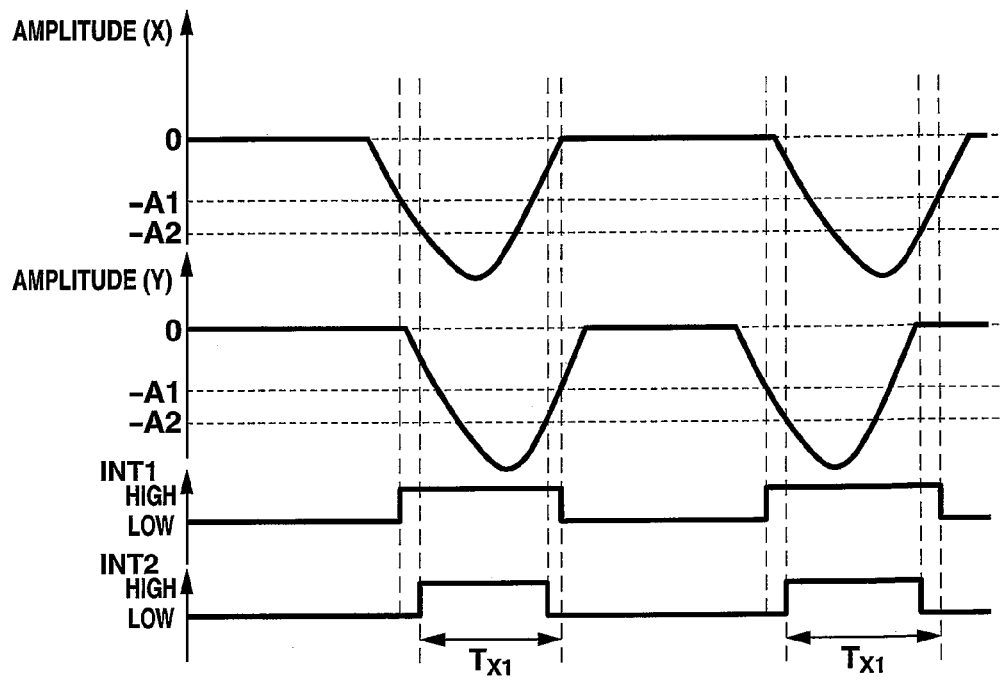
FIGS. 20A and 20B are diagrams for explaining about the interrupt signals output from the reference value detection circuit of an ninth embodiment, and detections of running states and double taps based on the interrupt signals.
Figure 20B:
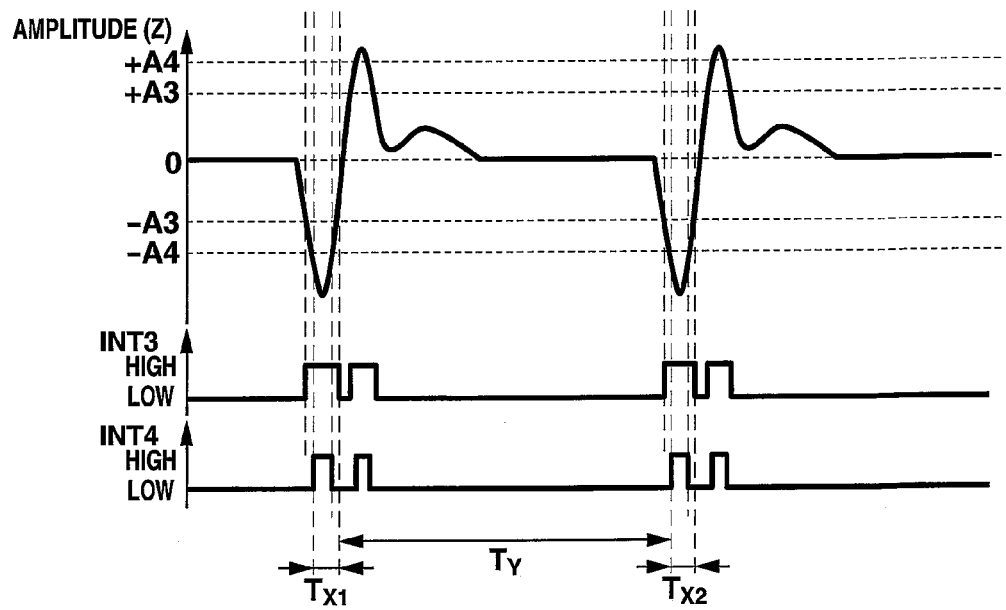

FIGS. 20A and 20B are diagrams for explaining about the interrupt signals output from the reference value detection circuit 511 of the acceleration sensor 51, and detections of the running state and double tap based on these interrupt signals.

The reference value detection circuit 511 generates the interrupt signals INT1, INT2 depending on a magnitude relation between the reference value and the larger value among the acceleration amplitude in X direction and the acceleration amplitude in Y direction. The interrupt signals INT3, INT4 are generated depending on a magnitude relation between the reference value and the acceleration amplitude in Z direction. The reference values A1, A3 relevant to the interrupt signals INT1, INT3 are set to have smaller values than the reference values A2, A4 relevant to the interrupt signals INT2, INT4, respectively.

As illustrated in FIG. 20B, the acceleration changes due to tap operation occurring in the measurement values in Z direction are, in the interrupt signals INT3, INT4, output as the same waveform as that of the interrupt signal INT2 in the non-running state in the second embodiment (see FIG. 7). In other words, because there is no influence of the accelerations in X direction and Y direction in this case, the high-level sections of the interrupt signals INT3, INT4 occur individually for acceleration changes in plus and minus directions.

The acceleration change which is due to running and occurs in the measurement values within the X-Y plane occurs as illustrated in FIG. 20A, similarly to the case of the eighth embodiment. The interrupt signals INT1, INT2 have the widths of high-level periods different from each other depending on the difference of magnitudes of the reference values A1, A2.

Figure 21:
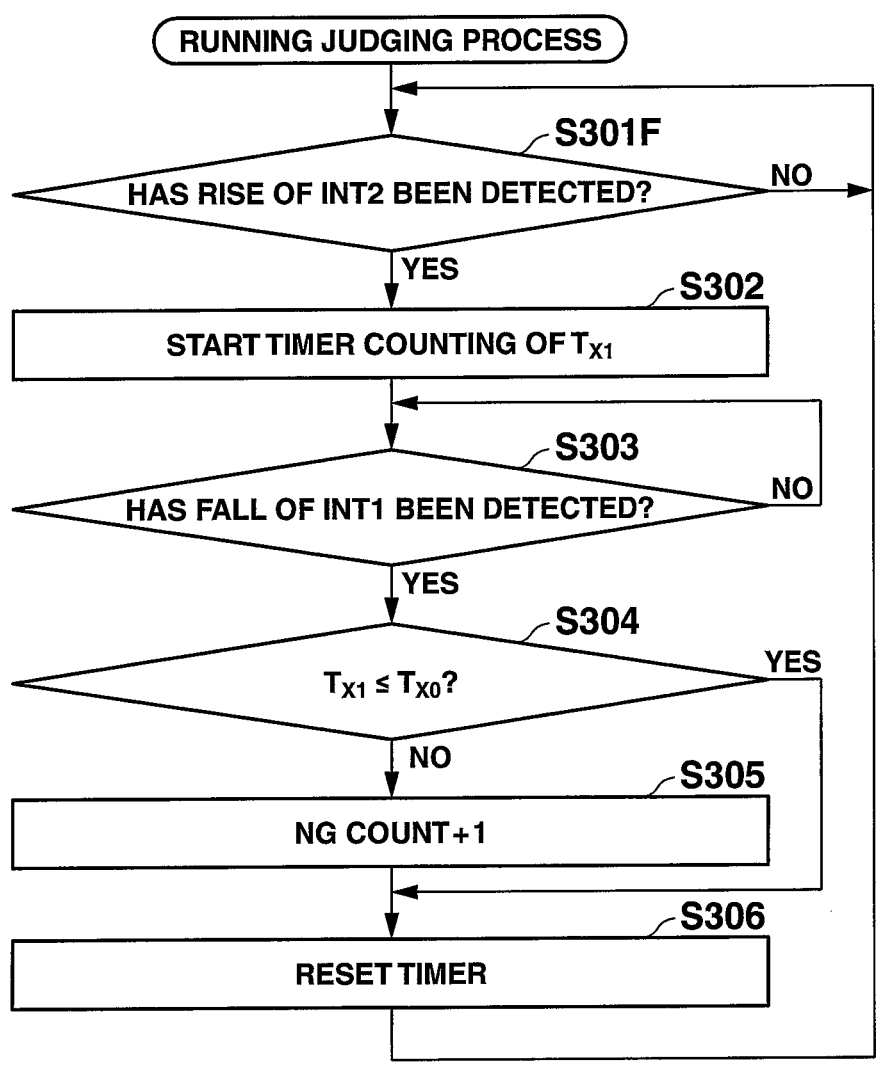
FIG. 21 is a flowchart illustrating control procedures of the double tap detecting process of the ninth embodiment.
Figure 22:
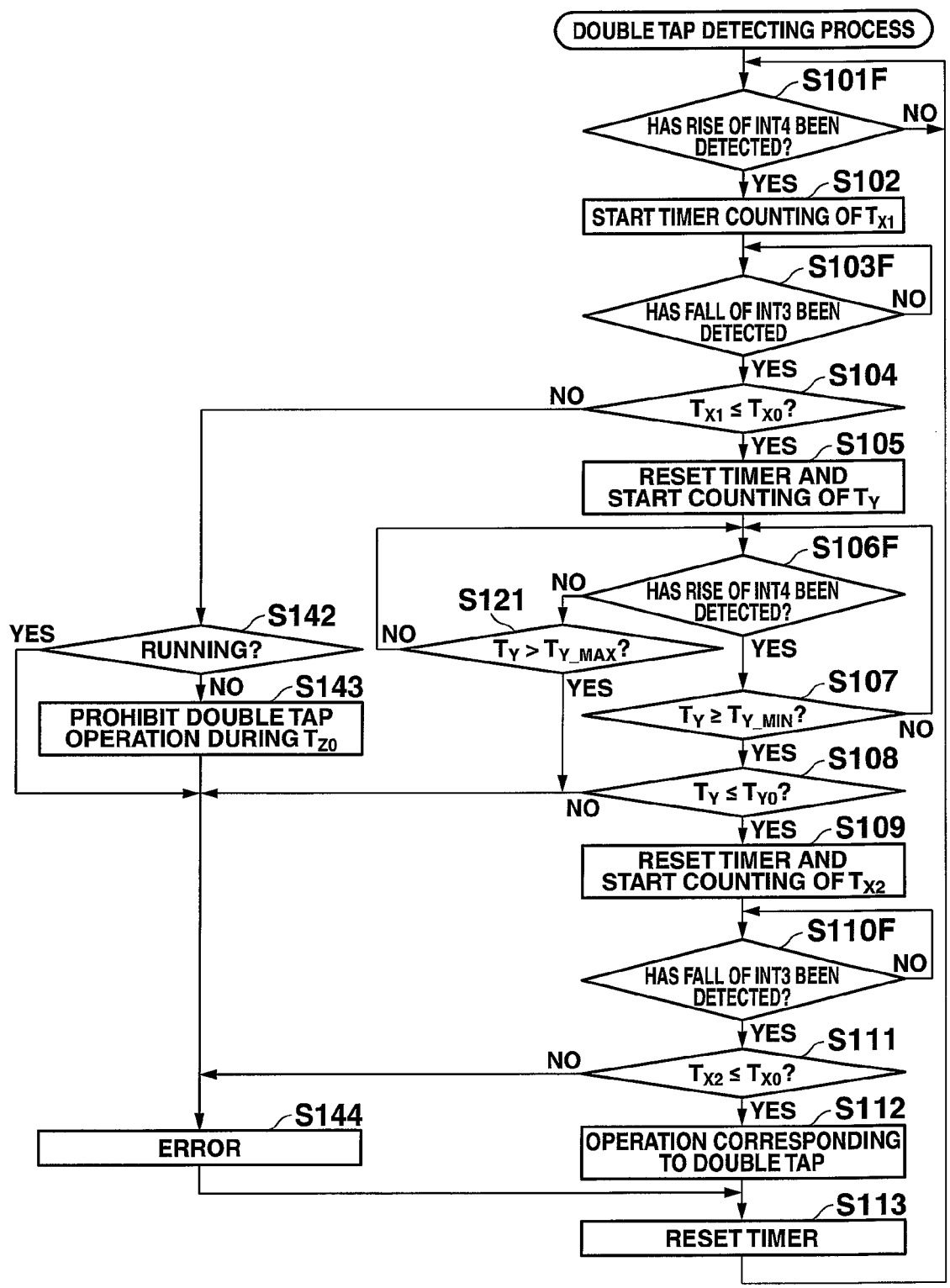
FIG. 22 is a flowchart illustrating control procedures of the double tap detecting process of the ninth embodiment.

FIG. 21 is a flowchart illustrating control procedures of the running detecting process executed by the CPU 41 of the electronic watch 40 of this embodiment. FIG. 22 is a flowchart illustrating control procedures of the double tap detecting process executed by the CPU 41.

This running detecting process is same as the running detecting process of the eighth embodiment except for the point that Step S301 is replaced with Step S301F, so the same reference letters are used and the descriptions thereof are omitted.

Additionally, in the double tap detecting process of this embodiment, Steps S101, S103B, S106 and S110B in the double tap detecting process of the eighth embodiment are replaced with Steps S101F, S103F, S106F and S110F, respectively. Other processes are same as those of the double tap detecting process of the first and eighth embodiments, so the same reference letters are used and the descriptions thereof are omitted.

When the running detecting process is started, as illustrated in FIG. 21, the CPU 41 judges whether or not the rise of the interrupt signal INT2 has been detected (Step S301F). When it is judged that the rise of the interrupt signal INT2 has not been detected (Step S301F: NO), the CPU 42 repeatedly performs the processing of Step S301F. When it is judged that the rise of the interrupt signal INT2 has been detected (Step S301F: YES), the CPU 41 causes the timer to operate to start counting of the duration time $T_{X1}$ (Step S302).

Meanwhile, as illustrated in FIG. 22, in the double tap detecting process, the CPU 41 firstly judges whether or not the rise of the interrupt signal INT4 has been detected (Step S101F). When it is judged that the rise of the interrupt signal INT4 has not been detected (Step S101F: NO), the CPU 41 repeatedly performs the processing of Step S101F. When it is judged that the rise of the interrupt signal INT4 has been detected (Step S101F: YES), the processing by the CPU 41 shifts to Step S102.

After counting of the duration time $T_{X1}$ is started in the processing of Step S102, the CPU 41 judges whether or not the fall of the interrupt signal INT3 has been detected (Step S103F). When it is judged that the fall of the interrupt signal INT3 has not been detected (Step S103F: NO), the CPU 41 repeatedly performs the processing of Step S103F, and when it is judged that the fall of the interrupt signal INT3 has been detected (Step S103F: YES), the processing by the CPU 41 shifts to Step S104.

Similarly, after counting of the time interval $T_Y$ is started in the processing of. Step S105, the CPU 41 judges whether or not the rise of the interrupt signal INT4 has been detected (Step S106F). When it is judged that the rise of the interrupt signal INT4 has not been detected (Step S106F: NO), the processing by the CPU 41 shifts to Step S121. When it is judged that the rise of the interrupt signal INT4 has been detected (Step S106F: YES), the processing by the CPU 41 shifts to Step S107.

Moreover, after counting of the duration time $T_{X2}$ is started in the processing of Step S109, the CPU 41 judges whether or not the fall of the interrupt signal. INT3 has been detected (Step S110F). When it is judged that the fall of the interrupt signal INT3 has not been detected (Step S110F: NO), the CPU 41 repeatedly performs the processing of Step S110F, and when it is judged that the fall of the interrupt signal INT3 has been detected (Step S110F: YES), the processing by the CPU 41 shifts to Step S111.

As described above, in the electronic watch 40 of the ninth embodiment, the reference value detection circuit 511 outputs the interrupt signals INT1, INT2, which are generated depending on the X-direction acceleration and the Y-direction acceleration, and the interrupt signals INT3, INT4, which are generated depending on the Z-direction acceleration. The running state judgment is performed by the running detecting process and running judging process using the interrupt signals INT1, INT2, and only the double tap detection is performed by the double tap detecting process using the interrupt signals INT3, INT4. Therefore, the double tap detection can be performed while separating the acceleration change due to double tapping from the acceleration change due to running in the running state. Moreover, also in this case, judgment accuracy can be improved by performing the running judgment and the double tap detection by using the two-staged reference values, and the detection ratio of the tap operation in the running state can be improved without increasing the misdetections in the non-running state by lowing the judgment criterion for double tap detection in the running state.

Additionally, the present invention is not limited to the above embodiment, and various modification can be added thereto.

For example, though the largest value among the acceleration amplitudes in the three axial directions is compared with the reference values A1, A2 in the above embodiments (first to seventh embodiments), there can be also adopted the configuration where the interrupt signal INT1 is output when the acceleration amplitude in the axial direction, by which the interrupt signal INT2 is firstly changed to be high level, falls below the reference value A1.

The above embodiments performs judgment on the amplitude (absolute value) of the acceleration, but in the case that data of Z-direction components are independently obtained as the cases of the eighth and ninth embodiments, the tap operation detection can be judged only when the first acceleration change has a negative value in Z direction.

The above embodiments divides the user movement states into the running state and the state of standing still. The running state includes movements/motions associated with periodical acceleration amplitude which is the same level as the acceleration amplitude due to tap operation during brisk walking.

Although the double tap detecting process is the resident program in the above embodiments, the double tap detecting process may be invoked to be activated at the time when the first interrupt signal INT2 is input, and terminate the program when the judgment of the double tap operation ends.

In the above embodiments, as means for lowering the tap detection criterion in the running state, there are adopted: a method for extending the reference time $T_{X0}$ (including the case of not using the reference time $T_{X0}$ as the standard, namely, regarding the reference time $T_{X0}$ as infinite); removing the limitation that the double tap operation is prohibit until the prohibition period $T_{Z0}$ has passed after NG judgment; and lowering the reference values A1, A2. One of them or all of them can be arbitrarily combined with one another to be used.

Although each of the measurement values of accelerations in the three axial directions is individually compared with the reference value, it is also possible to calculate a total acceleration and compare the calculated value with the reference value.

In the case that there are plural rises of the interrupt signal INT2 prior to the rise of the interrupt signal INT1, the duration time $T_{X1}$ can be calculated for each of the plural rises. Moreover, in the case that there are plural rises of the interrupt signal INT2 before the time interval $T_Y$ exceeds the reference time $T_{Y0}$, the time interval $T_Y$ and the duration time $T_{X2}$ can be calculated for each of the plural rises.

Although the above embodiments describe the example of the electronic watch 40, the present invention can also be applied to the portable display device worn/held by a user. Especially, terminals mounted on a wrist and/or arm, for example, electronic pedometers and/or Global Positioning System (GPS) loggers are preferable because the direction of acceleration due to tapping likely becomes different from the direction of acceleration due to running in these devices, but the present invention is not limited thereto. The present invention can be applied also to smartphones and tablet terminals in a similar way.

The above embodiments describe stopping the announcement operation relevant to the announcement information received from the smartphone 10 as the external device as the example of the operation corresponding to the double tap, but it is not limited to such example. The present invention can also be applied to the announcement information set in the electronic watch 40, for example, stop of an alarm announcement and/or timer announcement.

The seventh embodiment describes the case that the interrupt signals INT1H, INT1L, INT2AH and INT2L relevant to four kinds of reference values, respectively, as the examples, but it is possible to make the reference values relevant to the interrupt signals INT1H, INT2H fixed or make the reference values relevant to the interrupt signals INT1L, INT2L so that there are three kinds of reference values. It is also possible to make the interrupt signals INT2L, INT1H based on the common reference value.

Other structures/configurations illustrated in the above embodiments and specific details of circuits and/or procedures can be arbitrarily changed without departing from the spirit of the present invention.

Additionally, thought the signals INT1, INT2 etc. are directly output as the interrupt signals in the above embodiments, it is also possible to make, in the high-level periods of the signals INT1, INT2 or at the timings of the rises and falls of the signals INT1, INT2, the interrupt signals indicating those facts output to the CPU 41.

What is claimed is:

1. A portable display device comprising:
an acceleration sensor that measures at least one acceleration;

a detection signal outputting section that outputs a detection signal when at least one measurement value relevant to a magnitude of the acceleration changes across a predetermined reference value;

a movement duration time calculating section that calculates a duration time of at least one movement state in which the measurement value exceeds the predetermined reference value by using the detection signal;

a running judging section that judges whether or not the movement state is due to running of a user, based on an occurrence frequency of the movement state and the duration time calculated individually for the movement state;

a running state setting section that sets the movement state as a running state during a predetermined time period when the running judging section judges that the movement state is due to the running of the user;

a movement interval calculating section that calculates, in the case that a plurality of movement states are measured, a time interval between the movement states by using the detection signal;

a continuous tap judging section that judges whether or not the plurality of movement states are measured due to continuous tap operations of the user, according to a judgment condition based on the calculated duration time and the calculated time interval; and a setting range changing section that changes a setting of a range of the duration time of the judgment condition for judging the continuous tap operations of the user in the continuous tap judging section in the case when the movement state is set as the running state by the running state setting section to be a broader range than a range of the duration time of the judgment condition in a non-running state;

wherein the detection signal outputting section includes:
a vertical acceleration detection signal outputting section that outputs the detection signal when the measurement value relevant to a magnitude of a vertical acceleration in a direction perpendicular to a display screen, among the acceleration, changes in a predetermined direction across the predetermined reference value; and a parallel acceleration detection signal outputting section that outputs the detection signal when the measurement value relevant to a magnitude of a parallel acceleration within a plane parallel to the display screen, among the acceleration, changes in a predetermined direction across the predetermined reference value, wherein the running judging section judges whether or not the movement state is due to the running of the user, based on the occurrence frequency of the movement state and the duration time calculated individually for the movement state with respect to the parallel acceleration, and wherein the continuous tap judging section judges whether or not the plurality of movement states are measured due to continuous tap operations, according to the calculated duration time and the calculated time interval with respect to the vertical acceleration.

2. A method for detecting an operation in a portable display device using an acceleration sensor that measures at least one acceleration, the method comprising:

outputting a detection signal when at least one measurement value relevant to a magnitude of the acceleration changes across a predetermined reference value;

calculating a duration time of at least one movement state in which the measurement value exceeds the predetermined reference value by using the detection signal;

judging whether or not the movement state is due to running of a user, based on an occurrence frequency of the movement state and the duration time calculated individually for the movement state;

setting the movement state as the running state during a predetermined time period when it is judged that the movement state is due to the running of the user in the running judging step;

calculating, in the case that a plurality of movement states are measured, a time interval between the movement states by using the detection signal;

judging whether or not the plurality of movement states are measured due to continuous tap operations of the user, according to a judgment condition based on the calculated duration time and the calculated time interval; and changing a setting of a range of the duration time of the judgment condition for judging the continuous tap operations of the user in the continuous tap judging step in the case when the movement state is set as the running state by the running state setting step to be a broader range than a range of the duration time of the judgment condition in a non-running state, wherein the detection signal outputting step comprises:
outputting the detection signal when the measurement value relevant to a magnitude of a vertical acceleration in a direction perpendicular to a display screen, among the acceleration, changes in a predetermined direction across the predetermined reference value; and outputting the detection signal when the measurement value relevant to a magnitude of a parallel acceleration within a plane parallel to the display screen, among the acceleration, changes in a predetermined direction across the predetermined reference value, wherein the running judging step judges whether or not the movement state is due to the running of the user, based on the occurrence frequency of the movement state and the duration time calculated individually for the movement state with respect to the parallel acceleration, and wherein the continuous tap judging step judges whether or not the plurality of movement states are measured due to continuous tap operations, according to the calculated duration time and the calculated time interval with respect to the vertical acceleration.

3. A portable display device comprising:
an acceleration sensor that measures at least one acceleration;

a detection signal outputting section that outputs a detection signal when at least one measurement value relevant to a magnitude of the acceleration changes across a predetermined reference value;

a movement duration time calculating section that calculates a duration time of at least one movement state in which the measurement value exceeds the predetermined reference value by using the detection signal;

a running judging section that judges whether or not the movement state is due to running of a user, based on an occurrence frequency of the movement state and the duration time calculated individually for the movement state;

a running state setting section that sets the movement state as a running state during a predetermined time period when the running judging section judges that the movement state is due to the running of the user;

a movement interval calculating section that calculates, in the case that a plurality of movement states are measured, a time interval between the movement states by using the detection signal;

a continuous tap judging section that judges whether or not the plurality of movement states are measured due to continuous tap operations of the user, according to a judgment condition based on the calculated duration time and the calculated time interval; and a setting range changing section that changes a setting of a range of the duration time of the judgment condition for judging the continuous tap operations of the user in the continuous tap judging section in the case when the movement state is set as the running state by the running state setting section to be a broader range than a range of the duration time of the judgment condition in a non-running state;

wherein the detection signal outputting section includes a vertical acceleration detection signal outputting section that outputs the detection signal when the measurement value relevant to a magnitude of a vertical acceleration in a direction perpendicular to a display screen changes in a predetermined direction across the predetermined reference value, and wherein the continuous tap judging section judges whether or not the plurality of movement states are measured due to continuous tap operations, according to the calculated duration time and the calculated time interval with respect to the vertical acceleration.

4. The portable display device according to claim 3, wherein:

the judgment condition includes an upper limit value of the duration time, and the setting range changing section increases the upper limit value.

5. The portable display device according to claim 4, wherein the increased upper limit value is less than an upper limit time previously determined depending on the duration time in the case that the movement state is the running state.

6. The portable display device according to claim 3, wherein the setting range changing section lowers the predetermined reference value.

7. The portable display device according to claim 3, wherein in the case that the movement state is not the running state, the setting range changing section performs setting by which the movement state detected during a predetermined prohibition period from a timing, at which the continuous tap judging section judges that the movement state is not due to the continuous tap operations, is not regarded as being due to each of the tap operations.

8. The portable display device according to claim 3, wherein:

the detection signal outputting section further includes:

a first detection signal outputting section that outputs the detection signal corresponding to a first reference value; and a second detection signal outputting section that outputs the detection signal corresponding to a second reference value which is larger than the first reference value, and the movement duration time calculating section calculates the duration time from a time at which the measurement value exceeds the second reference value to a time at which the measurement value falls below the first reference value.

9. The portable display device according to claim 3, wherein:

the detection signal outputting section further includes:

a first detection signal outputting section that outputs the detection signal corresponding to a first reference value; and a second detection signal outputting section that outputs the detection signal corresponding to a second reference value which is larger than the first reference value, and the movement duration time calculating section calculates the duration time from a time at which the measurement value exceeds the second reference value to a time at which the measurement value falls below the second reference value in the non-running state, and calculates the duration time from a time at which the measurement value exceeds the first reference value to a time at which the measurement value falls below the first reference value in the running state.

10. The portable display device according to claim 3, wherein the setting range changing section performs setting by which the detected movement state is not regarded as being due to each of the tap operations during a predetermined prohibition period, in the case that the occurrence frequency of the movement state in the non-running state is higher than a predetermined level.

* * * * *